(12) United States Patent
Goto et al.

(10) Patent No.: US 6,269,073 B1
(45) Date of Patent: Jul. 31, 2001

(54) DISC CASE WITH DUST SHIELD MEMBERS

(75) Inventors: Yoshikazu Goto, Hirakata; Yukio Nishino, Nara, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 08/782,145

(22) Filed: Jan. 10, 1997

(30) Foreign Application Priority Data

Jan. 10, 1996 (JP) .................................................. 8-002607

(51) Int. Cl.[7] ....................................................... G11B 3/70
(52) U.S. Cl. ............................................................ 369/291
(58) Field of Search ........................... 360/133; 369/291, 369/77.1, 77.2

(56) References Cited

U.S. PATENT DOCUMENTS

| | | | |
|---|---|---|---|
| 4,680,662 | * 7/1987 | Fukishima et al. | 360/133 |
| 4,682,260 | * 7/1987 | Oishi et al. | 360/133 |
| 4,740,948 | * 4/1988 | Nakamori et al. | 369/291 |
| 4,780,868 | 10/1988 | Vignal | 369/291 |
| 4,959,744 | * 9/1990 | Kanazawa et al. | 360/133 |

(List continued on next page.)

FOREIGN PATENT DOCUMENTS

| | | |
|---|---|---|
| 0195535 | 9/1986 | (EP) . |
| 195 535 | 9/1986 | (EP) . |
| 0295025 | 12/1988 | (EP) . |
| 295 025 | 12/1988 | (EP) . |
| 0332214 | 9/1989 | (EP) . |

(List continued on next page.)

OTHER PUBLICATIONS

European Search Report dated Dec. 12, 1997 for EP 96 94 3299.
International Search Report corresponding to PCT/JP96/03811 dated Apr. 22, 1997.
European Search Report, application No. 00102638.4, dated May 8, 200.
European Search Report, application No. 00102639.2, dated May 8, 2000.

Primary Examiner—David Davis
Assistant Examiner—Tod Kupstas
(74) Attorney, Agent, or Firm—Ratner & Prestia

(57) ABSTRACT

A disc case having a case main unit including an accommodation chamber for rotatably accommodating a disc having a signal recording surface on at least one side of the disc, support member access openings provided in the top and bottom walls of the accommodation chamber so that a chucking member can apply an external pressure to the disc, a head access opening formed in the top or bottom wall of the accommodation chamber and tangent to the side wall surface of the accommodation chamber so that a read/write head can read and/or record signals on the signal recording surface of the disc, and a concave portion formed in an area extending from the side wall surface at the head access opening to the front fringe portion of the case main unit and concave with respect to the top or bottom surface of the main unit of the case. The disc case also includes a shutter installed on the case main unit to cover the support member access openings, the head access opening and the concave portion when the shutter is closed. The shutter opens to expose the support member access openings and the head access opening by sliding in at least one direction from the covered position along the front fringe portion of the case main unit. A shielding portion provided on the case main unit shields all or a part of the passages communicating with the accommodation chamber even when the shutter is closed.

17 Claims, 33 Drawing Sheets

U.S. PATENT DOCUMENTS

| | | | |
|---|---|---|---|
| 5,014,151 | | 5/1991 | Uehara et al. .................. 360/137 |
| 5,040,167 | * | 8/1991 | Tanala et al. .................. 369/291 |
| 5,166,922 | * | 11/1992 | Akiyama et al. .................. 369/291 |
| 5,278,717 | * | 1/1994 | Sasaki et al. .................. 360/133 |
| 5,289,457 | * | 2/1994 | Ariyama .................. 369/291 |
| 5,717,684 | * | 2/1998 | Akiyama et al. .................. 369/291 |
| 5,822,297 | * | 10/1998 | Fujisawa .................. 369/291 |

FOREIGN PATENT DOCUMENTS

| | | |
|---|---|---|
| 332 214 | 9/1989 | (EP) . |
| 0690444 | 1/1996 | (EP) . |
| 690 444 | 1/1996 | (EP) . |
| 2 275810 | 9/1994 | (GB) . |
| 2278510 | 9/1994 | (GB) . |
| 59-56680 | 4/1984 | (JP) . |
| 61-72785 | 5/1986 | (JP) . |
| 63-78374 | 5/1988 | (JP) . |
| 3-219479 | 9/1991 | (JP) . |
| 5-81815 | 4/1993 | (JP) . |
| 3-002033 | 7/1994 | (JP) . |
| 6-251535 | 9/1994 | (JP) . |
| 7-153222 | 6/1995 | (JP) . |

* cited by examiner

20: Top wall
21: Upper side surface
23: Upper concave portion
34: Upper surface

49-L: Left spring hook portion
50-L: Left engagement pawl portion
51-L: Left engagement support portion
54-L: Left slide stop surface
55-L: Left stop portion
58-L: Left locking pawl
59-L: Left driven hole blocking portion
60-L: Left side wall surface 53-L: Left groove 58-R: Right locking pawl 59-R: Right driven hole blocking portion
60-R: Right side wall surface
68-R: Right back surface 61: Shutter opening/closing means
62: Pin 41-L: Left driven surface
68-L: Left back surface
68-R: Right back surface 58-R: Right locking pawl 116-B, 116-F: Left and right case guides
117-F, 117-B: Case stoppers Fig. 32    ( PRIOR ART )
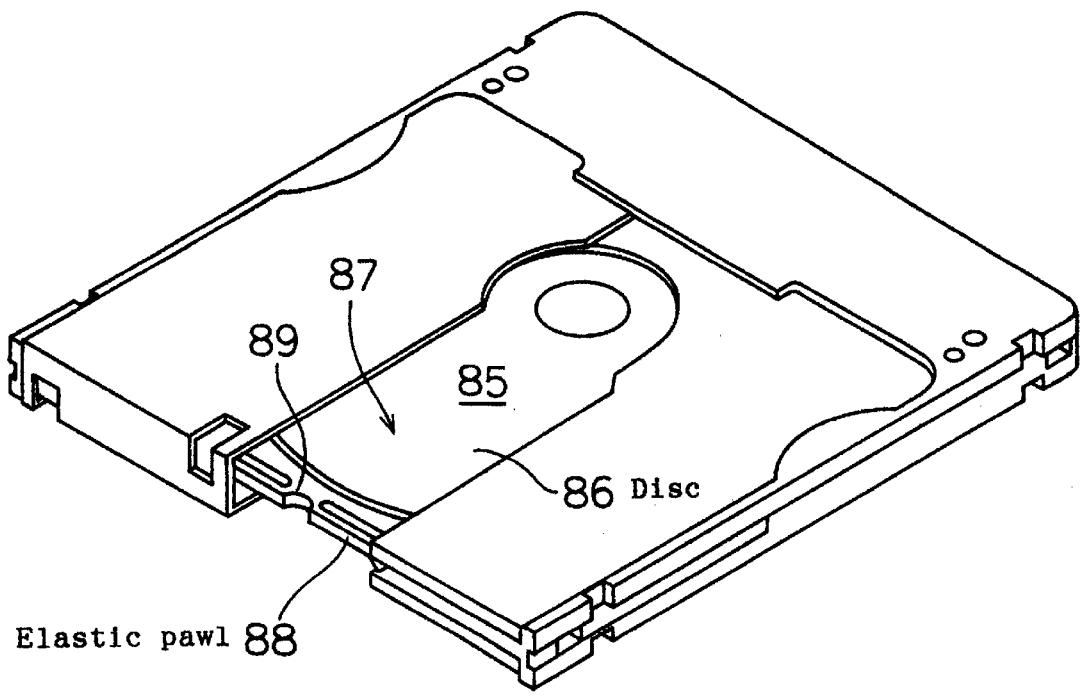
85: Opening
87: Accommodation chamber
89: Concave portion

DISC CASE WITH DUST SHIELD MEMBERS

BACKGROUND OF THE INVENTION

1. Field of the Invention

The present invention relates to a disc case capable of accommodating a disc-shaped signal recording medium, such as a magnetic disc or an optical disc.

2. Related Art of the Invention

A conventional disc case disclosed in Japanese Utility Model No. Hei 6-2132 is described below referring to FIG. 31, a perspective view showing the conventional disc. The main unit of a disc case 80 comprises an upper half 81 and a lower half 82 so as to form a disc accommodation chamber 87. The upper half 81 and the lower half 82 of the main unit of the disc case 80 are each provided with an opening 85 (see FIG. 32). In addition, the main unit of the disc case 80 is provided with a shutter 83 being slidable in the direction indicated by arrow F or G. The shutter 83 covers the openings 85 formed in the disc case 80. The openings 85 are formed (1) so that a chucking member (including a disc table) can externally pressure-contact a disc 86 accommodated inside and (2) so that an optical head can gain access to the signal recording surface of the disc 86. The openings 85 communicate with the accommodation chamber 87 accommodating the disc 86.

In case the shutter 83 covers the openings 85 as shown in FIG. 31, a pair of engagement holes 84 provided in the shutter 83 engage a pair of elastic pawls 88 (see FIG. 32) provided on the main unit 80 so as to prevent the shutter 83 from sliding in direction F or G.

The shutter 83 is opened to expose the opening 85 as described below. In order to release the elastic pawl 88 engaging one of the engagement holes 84, an engagement release member (release pin) (not shown) is inserted into the engagement hole 84. While being kept inserted in the engagement hole 84, the engagement release member is slid toward the other engagement hole 84, thereby opening the shutter 83.

The shutter 83 now being opened is closed as described below. The engagement release member remains inserted in the above-mentioned engagement hole 84. When the engagement release member is moved to its original position, the shutter 83 covers the exposed openings 85. After the shutter 83 covers the openings 85, the engagement release member is extracted from the engagement hole 84. Instead of the engagement release member, the elastic pawl 88 engages the engagement hole 84 so as to restore the lock condition.

The above-mentioned opening/closing operation of the shutter 83 is performed when the disc case 80 is inserted into or taken out of a signal recording and/or reproducing apparatus (player).

Consequently, the shutter can be opened and closed positively.

However, since the above-mentioned conventional disc case is not dustproof sufficiently, there is the danger of entry of dust into the accommodation chamber. More specifically, a concave portion 89 is formed in the range from the opening 85 to the front fringe portion of the case so as to decrease the amount of movement when the disc is dropped onto a disc table. Therefore, dust entered from the engagement holes 84 formed in the shutter 83 to the interior of the disc case 80 can further enter the accommodation chamber 87 via the concave portion 89.

SUMMARY OF THE INVENTION

Accordingly, in consideration of the above-mentioned problem, the object of the present invention is to provide a disc case capable of protecting the disc accommodation chamber thereof from dust.

To solve the problem, the present invention provides a disc case comprising:

the main unit of a case provided with:
(a) an accommodation chamber capable of rotatably accommodating a disc having a signal recording surface on at least one side thereof,
(b) support member access openings provided in the top and bottom walls of the accommodation chamber so that a chucking member can externally pressure-contact the disc,
(c) a head access opening formed in the top or bottom wall of the accommodation chamber and being tangent to the side wall surface of the accommodation chamber so that a head for reading and/or recording signals on the signal recording surface can gain access to the disc, and
(d) a concave portion formed in the range from the side wall surface at the head access opening to the front fringe portion side of the main unit of the case and being concave with respect to the top or bottom surface of the main unit of the case, a shutter installed on the main unit of the case so as to cover the support member access openings, the head access opening and the concave portion when closed, and so as to expose the support member access openings and the head access opening by sliding in at least one direction from the covering position along the front fringe portion of the main unit of the case when open, and a shielding portion provided on the main unit of the case so as to shield all or part of passages communicating with the accommodation chamber via the concave portion from areas which are not covered with the shutter even when the shutter is closed.

BRIEF DESCRIPTION OF THE INVENTION

Figure 6:
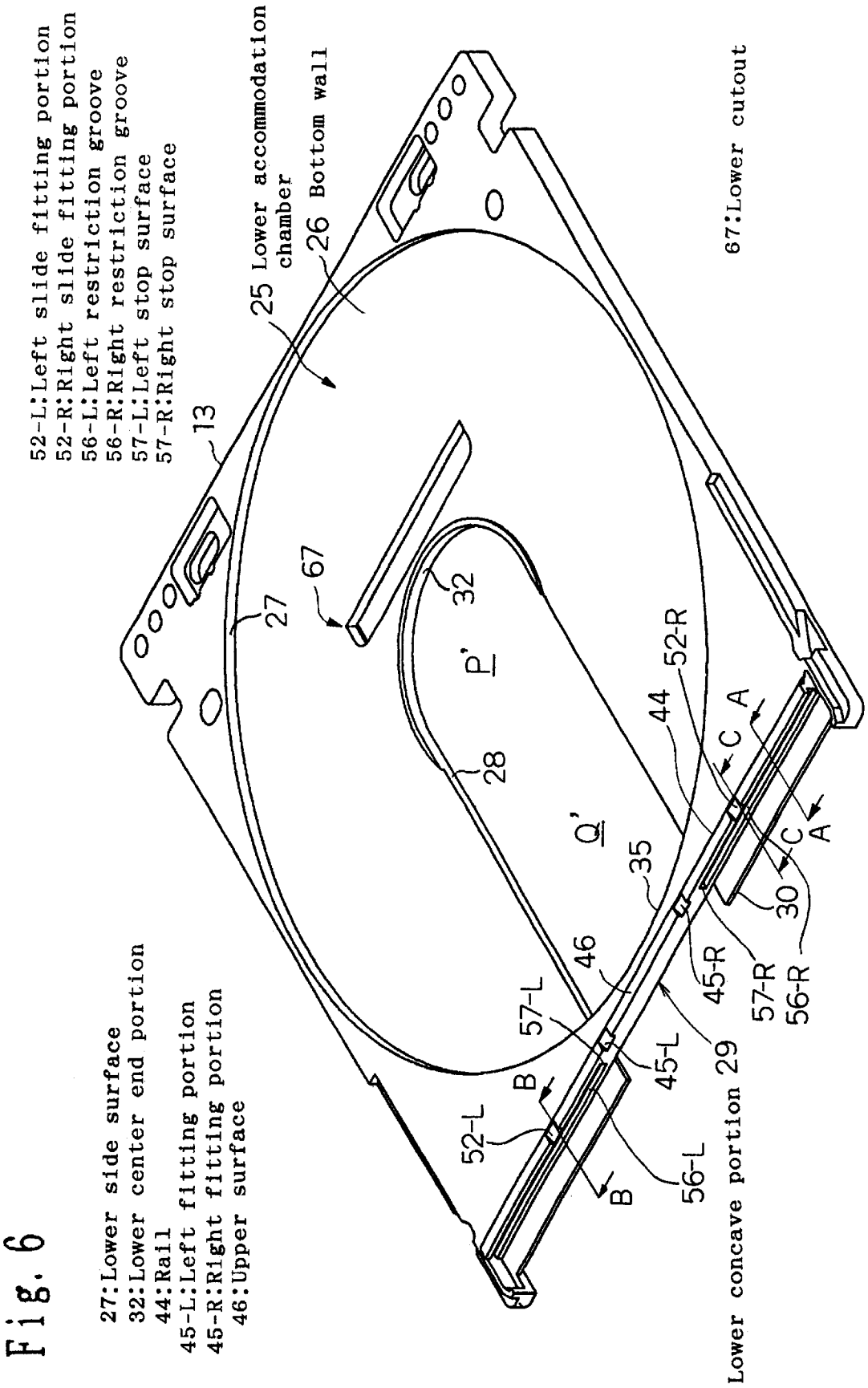
FIG. 6 is a perspective view showing the inner surface of a lower half 13 constituting the lower half of the accommodation chamber 18.
Figure 12:
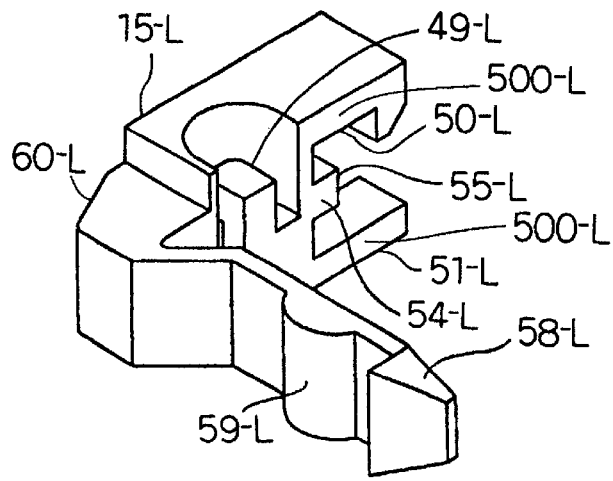
FIG. 12A is a perspective view showing a left slide member 15-L.
FIG. 12B is a sectional view taken on line B—B of FIG. 6.
Figure 12:
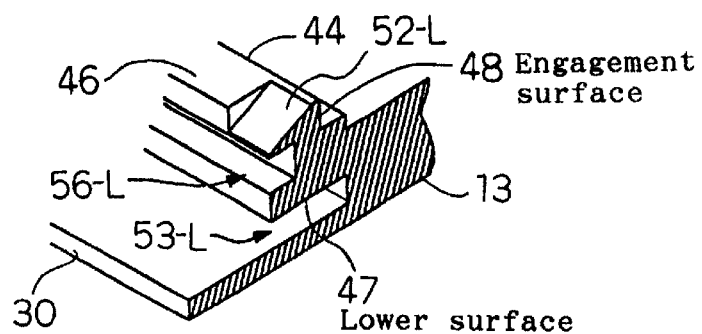
Figure 12C:
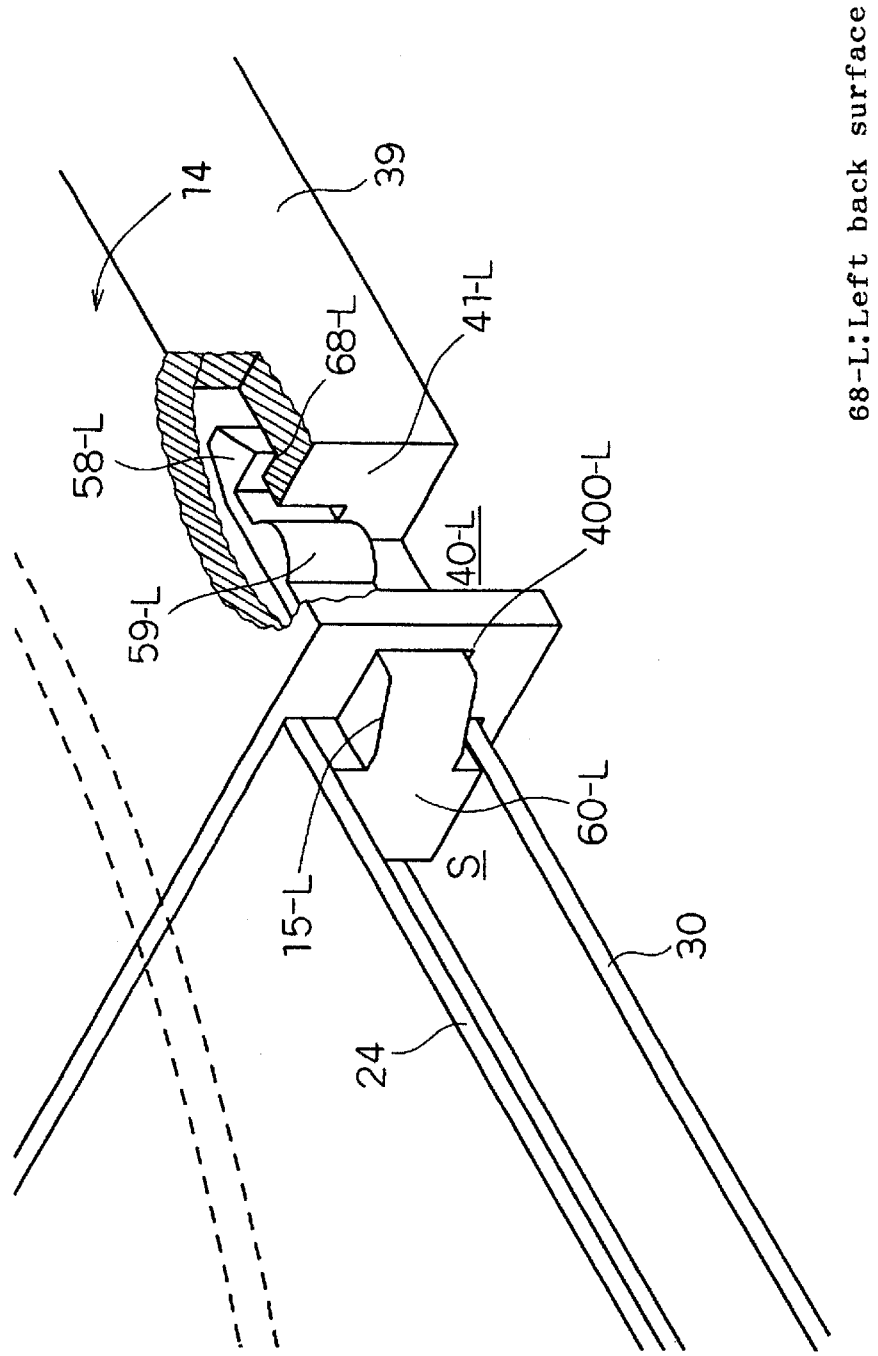
Figure 13:
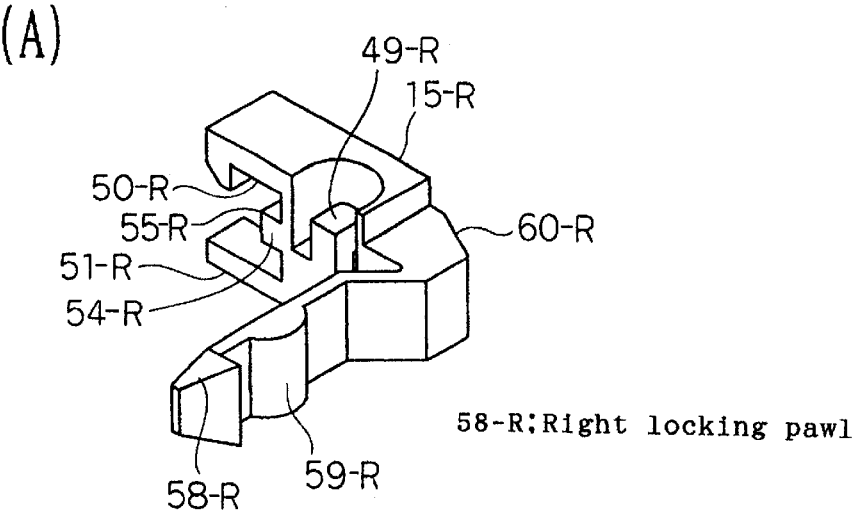
Figure 13:
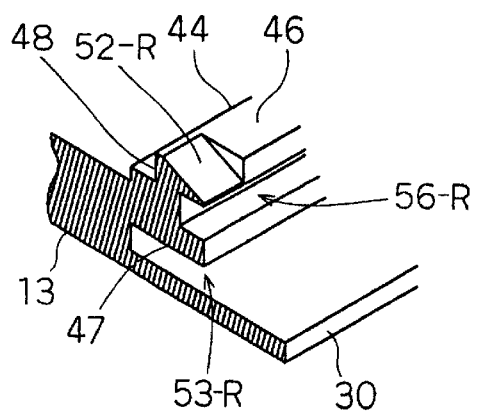
Figure 13:
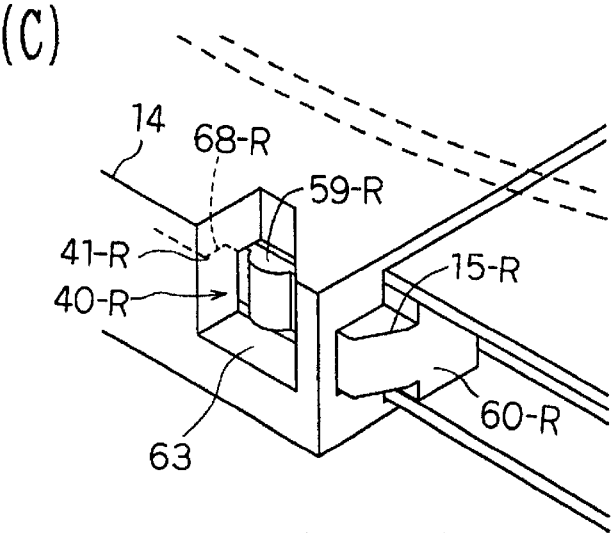

FIG. 12C is a magnified view taken near the left slide member 15-L when the shutter 14 covers an upper opening 22, a lower opening 28 and the like;

FIG. 13A is a perspective view showing a right slide member 15-R;

FIG. 13B is a sectional view taken on line C—C of FIG. 6; and

Figure 14:
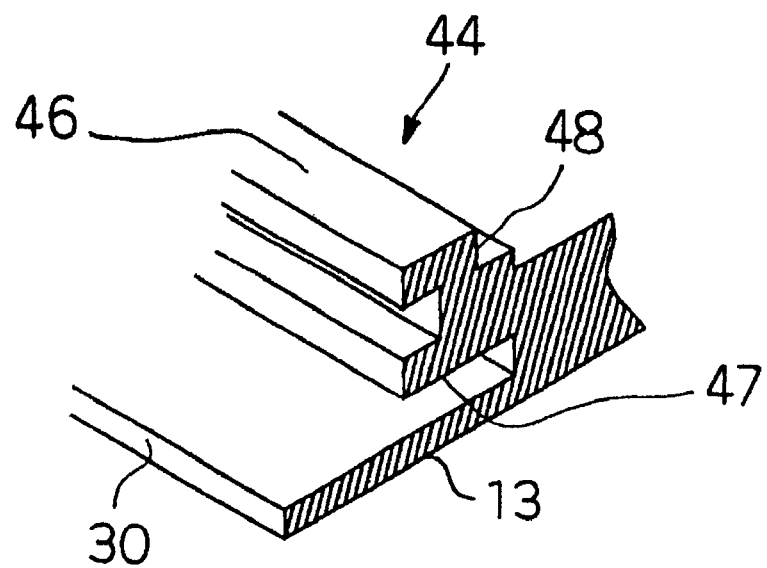
Figure 15:
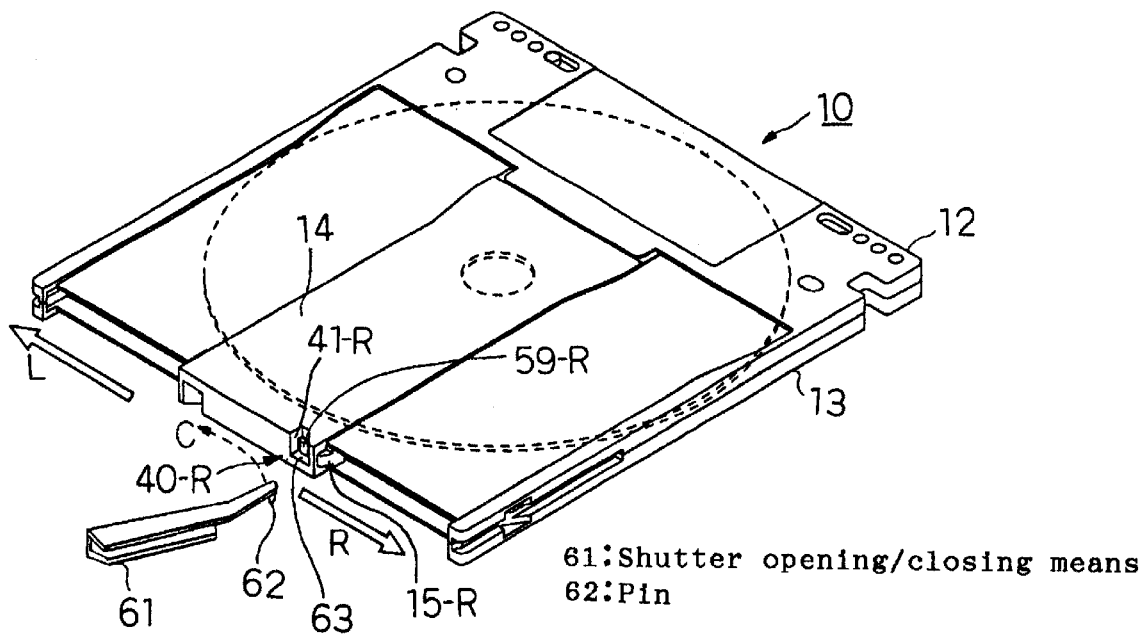
Figure 15:
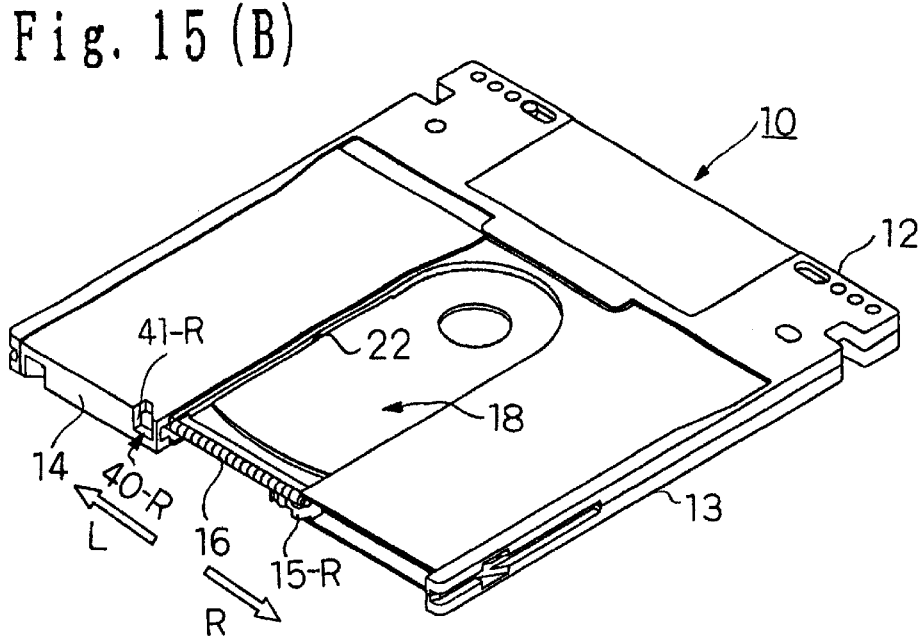
Figure 16:
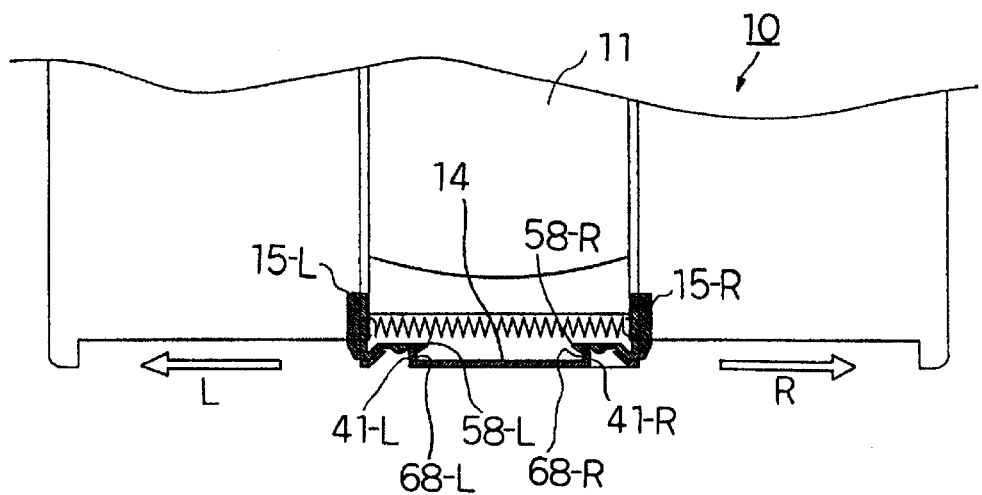
Figure 16:
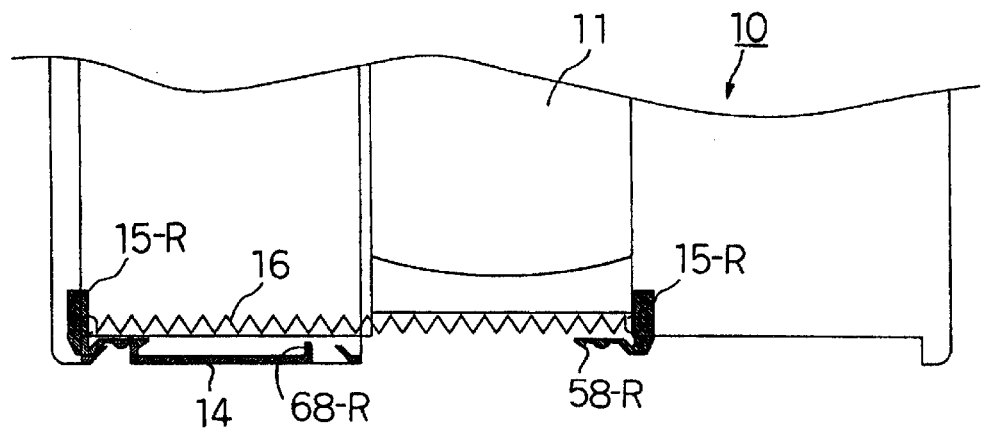
Figure 17:
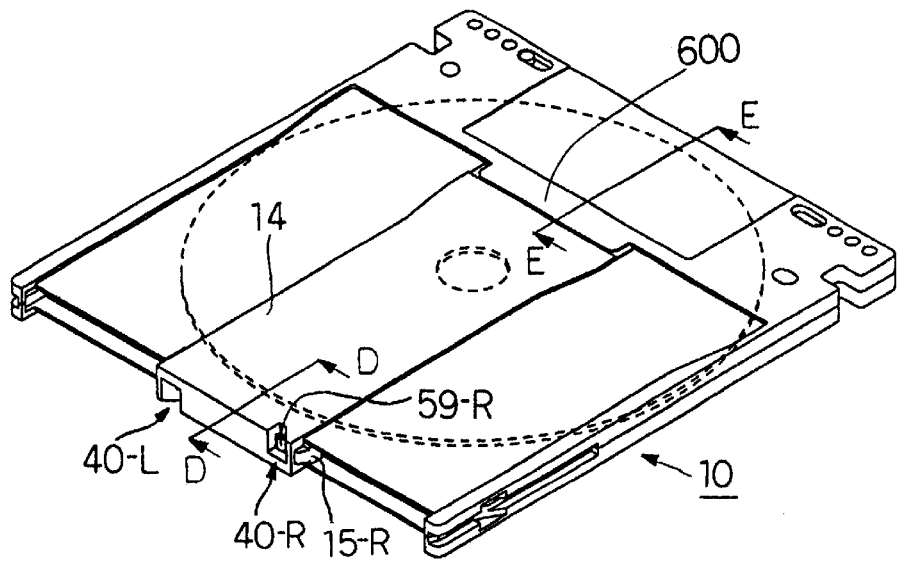
Figure 17:
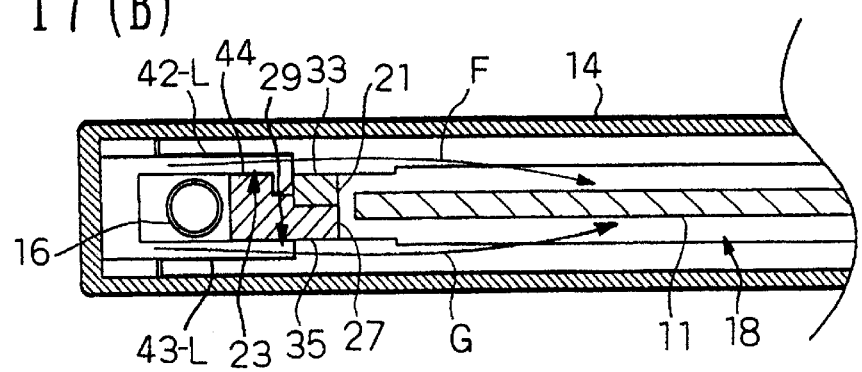
Figure 17:
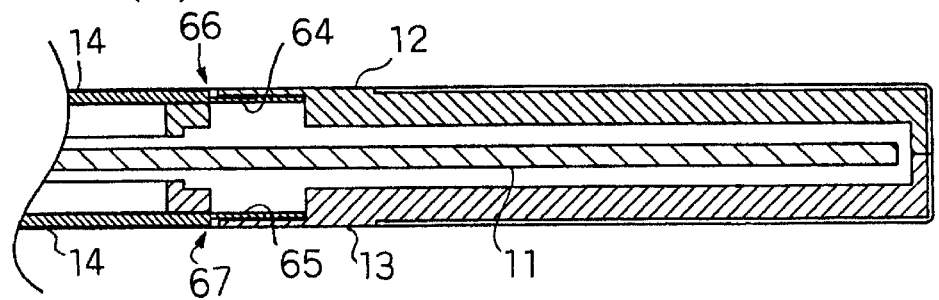

FIG. 13C is a magnified view taken near the right slide member 15-R when the shutter 14 covers the upper opening 22, the lower opening 28 and the like;

FIG. 14 is a sectional view taken on line A—A of FIG. 6;

FIG. 15A is a view showing a condition wherein the shutter 14 of the disc case 10 is closed; and FIG. 15B is a view showing a condition wherein the shutter 14 of the disc case 10 is open;

FIG. 16A is a view showing a condition wherein the shutter 14 of the disc case 10 is closed; and FIG. 16B is a view showing a condition wherein the shutter 14 of the disc case 10 is open;

FIG. 17A is a perspective view showing the shutter 14 positioned to cover the upper opening 22 and the like of the disc case 10;

FIG. 17B is a view taken on line D—D of FIG. 17A; and

Figure 18:
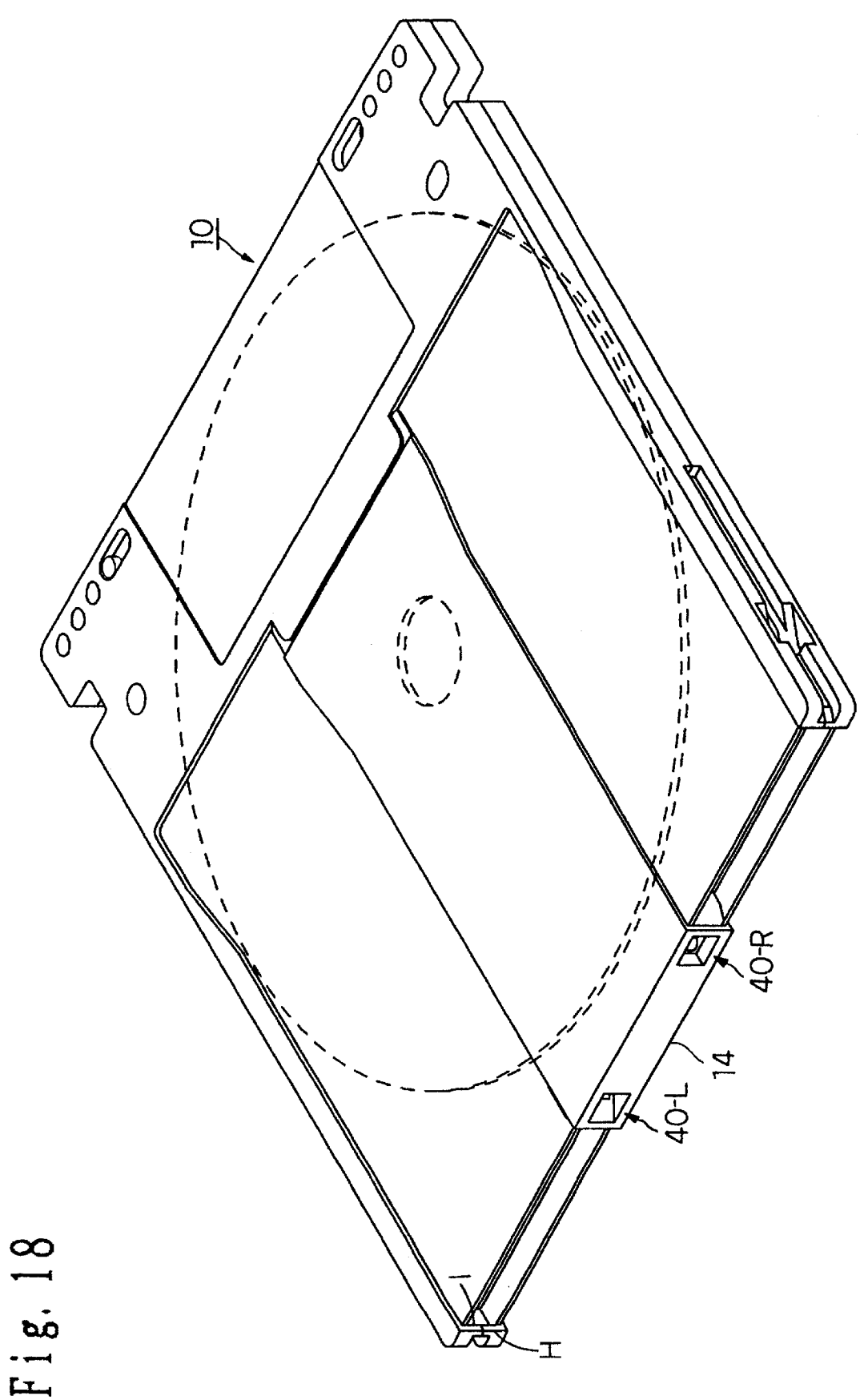
Figure 19:
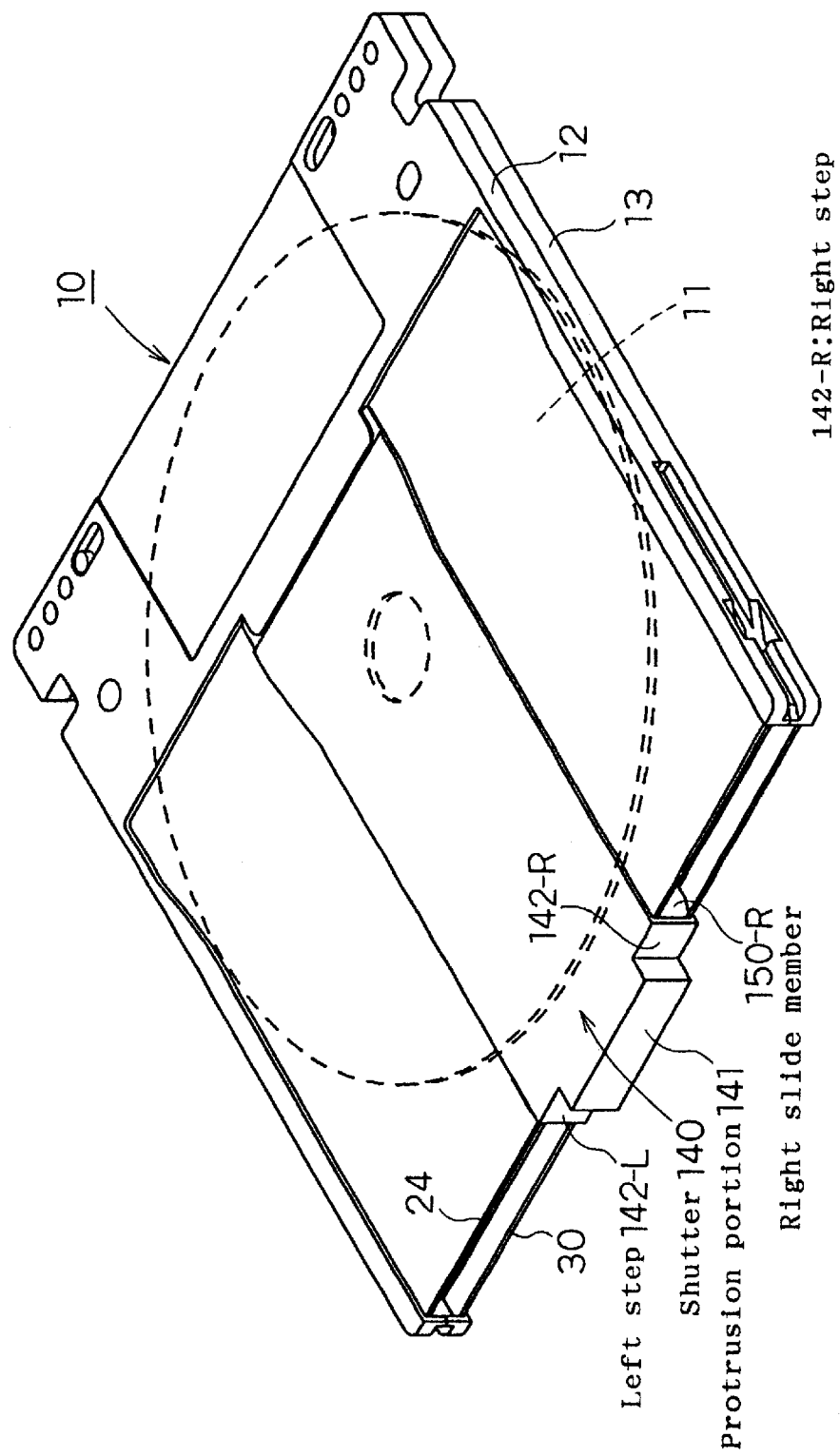
Figure 20:
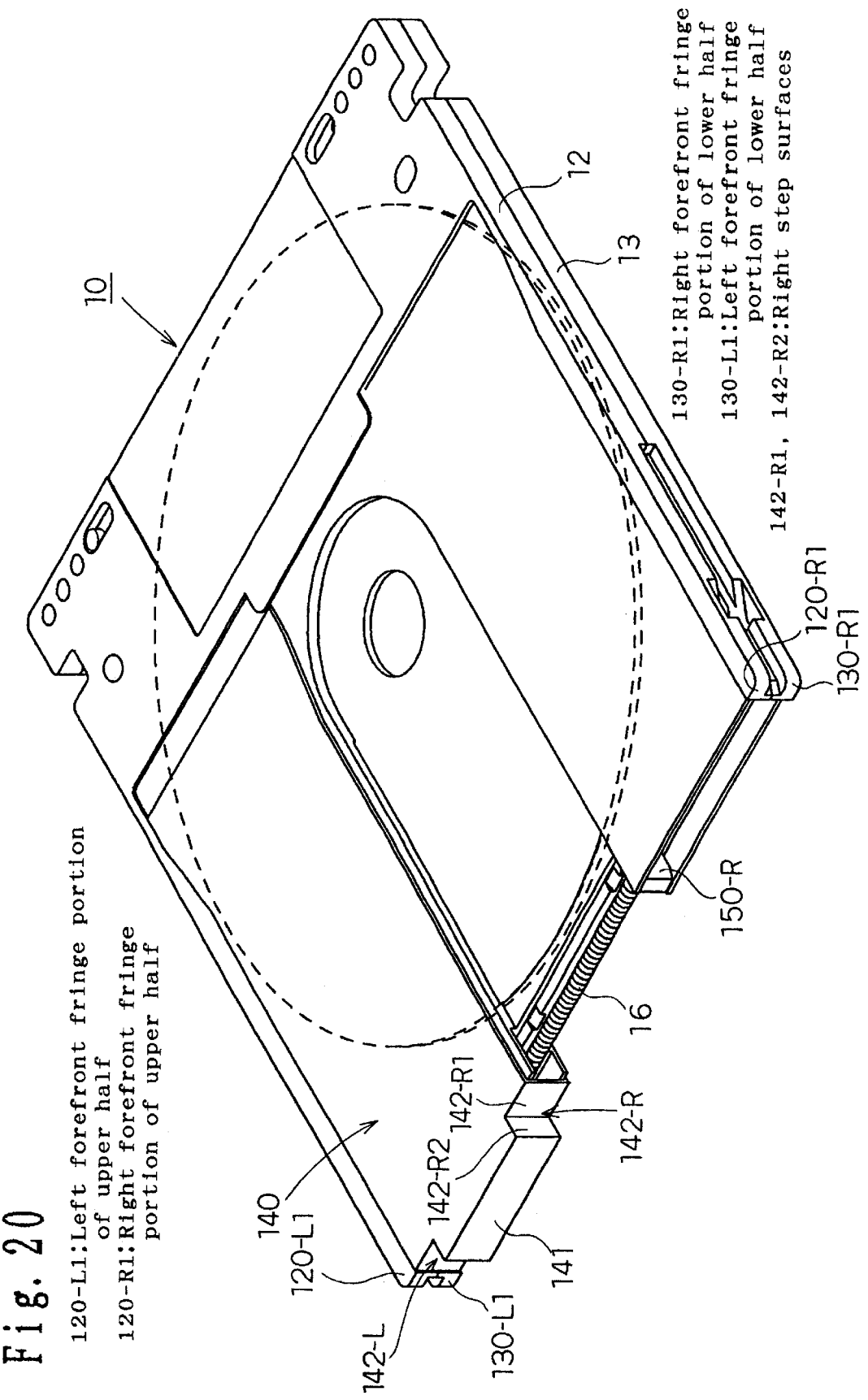
Figure 21:
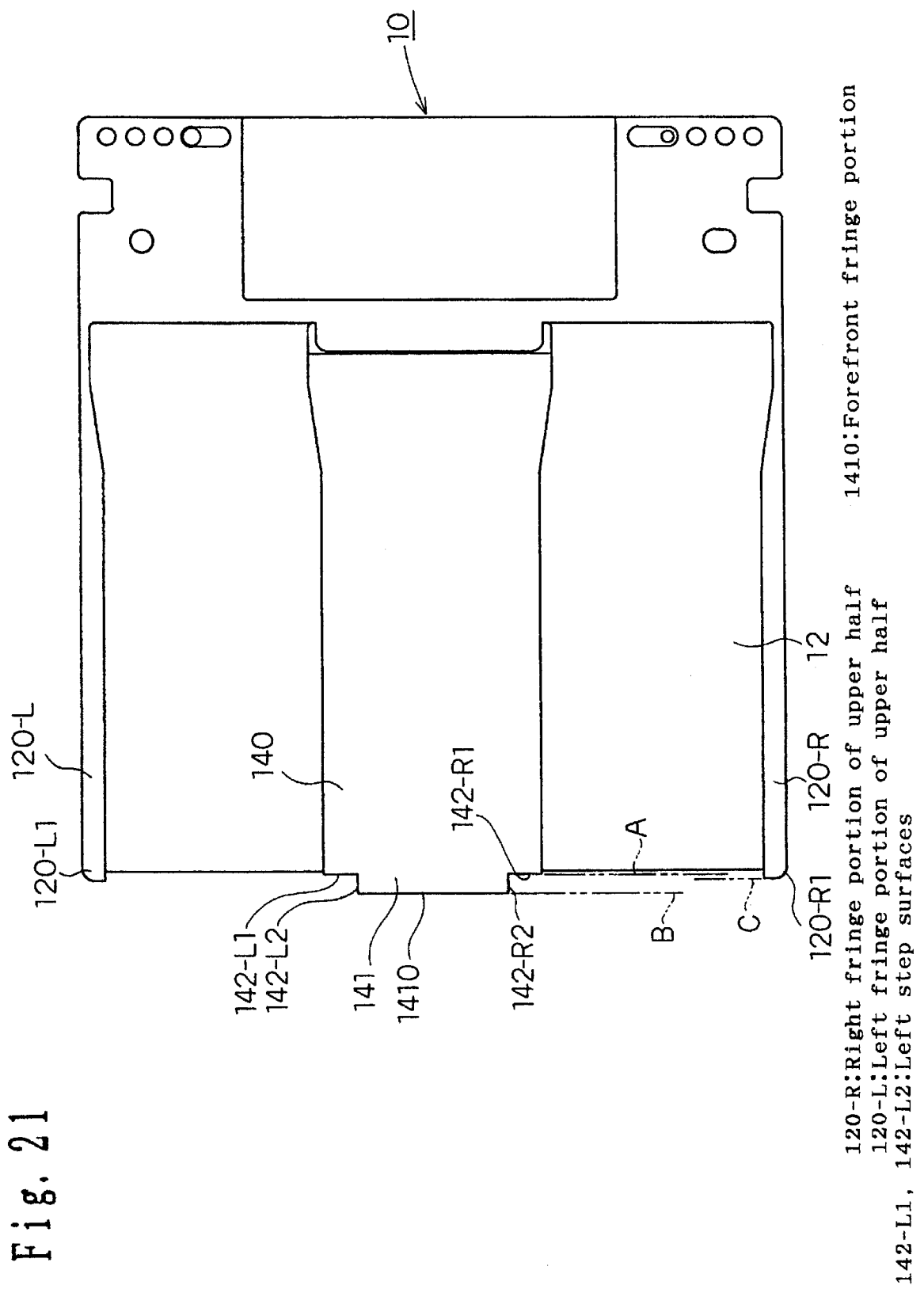
Figure 22:
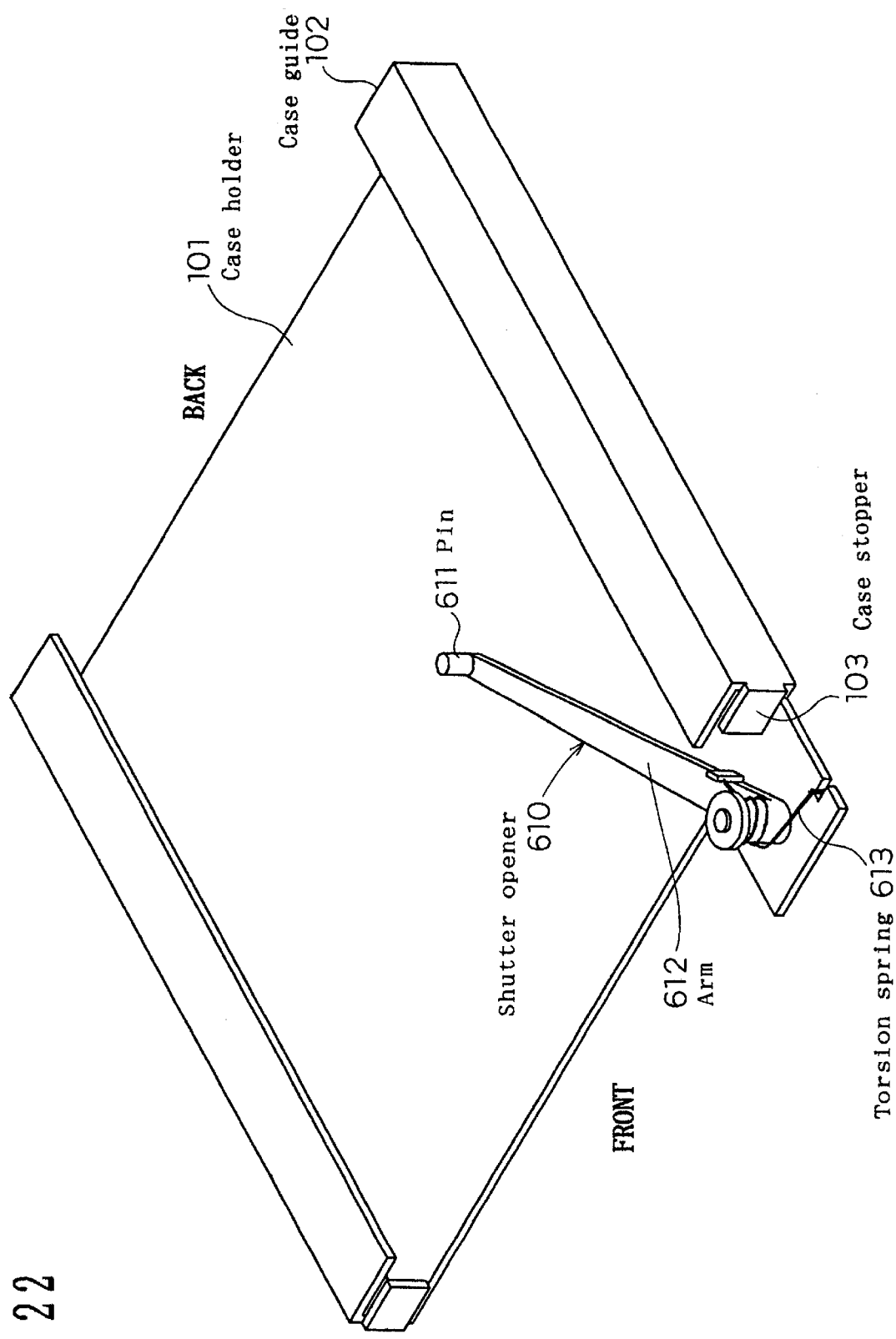
Figure 23:
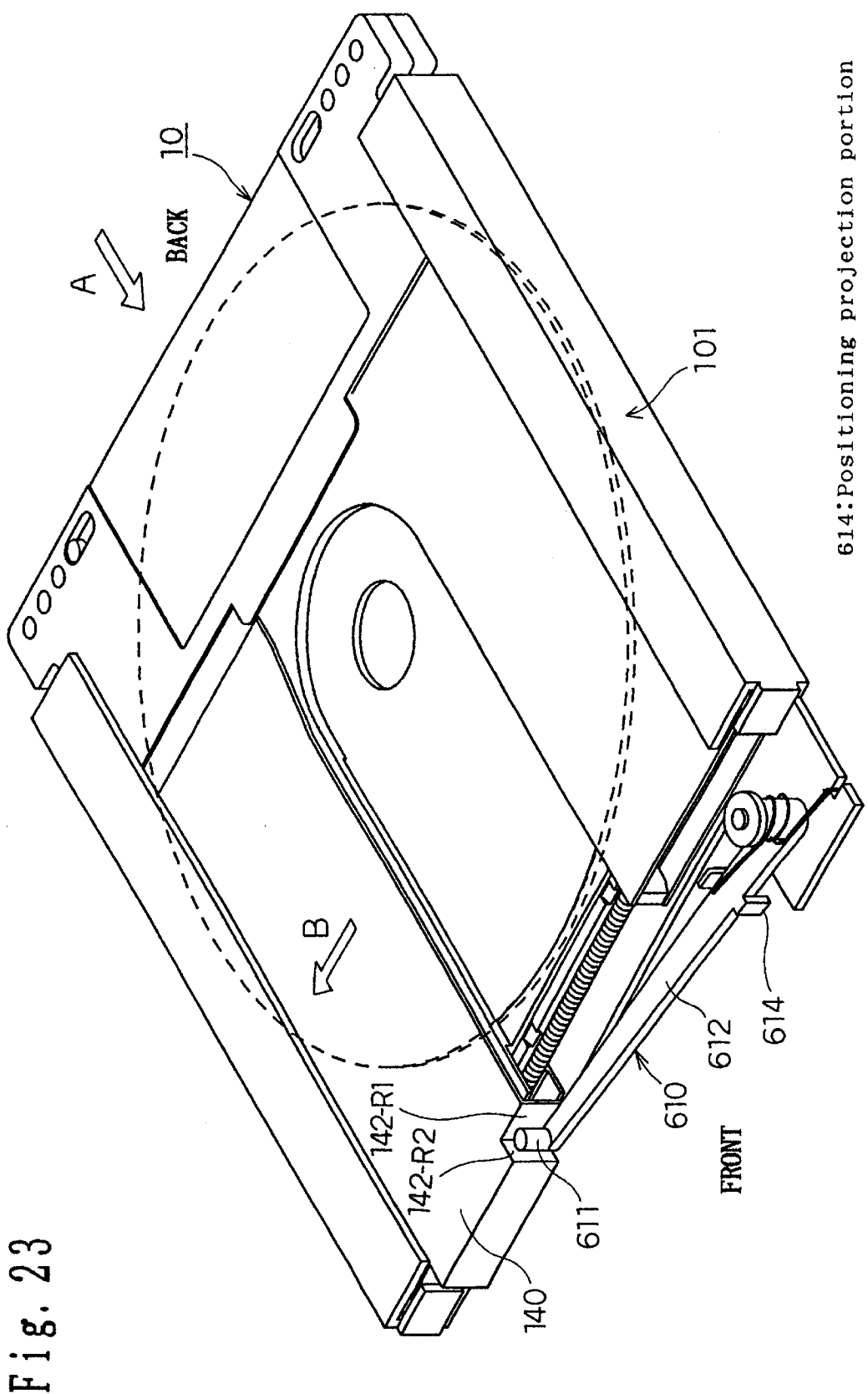
Figure 24:
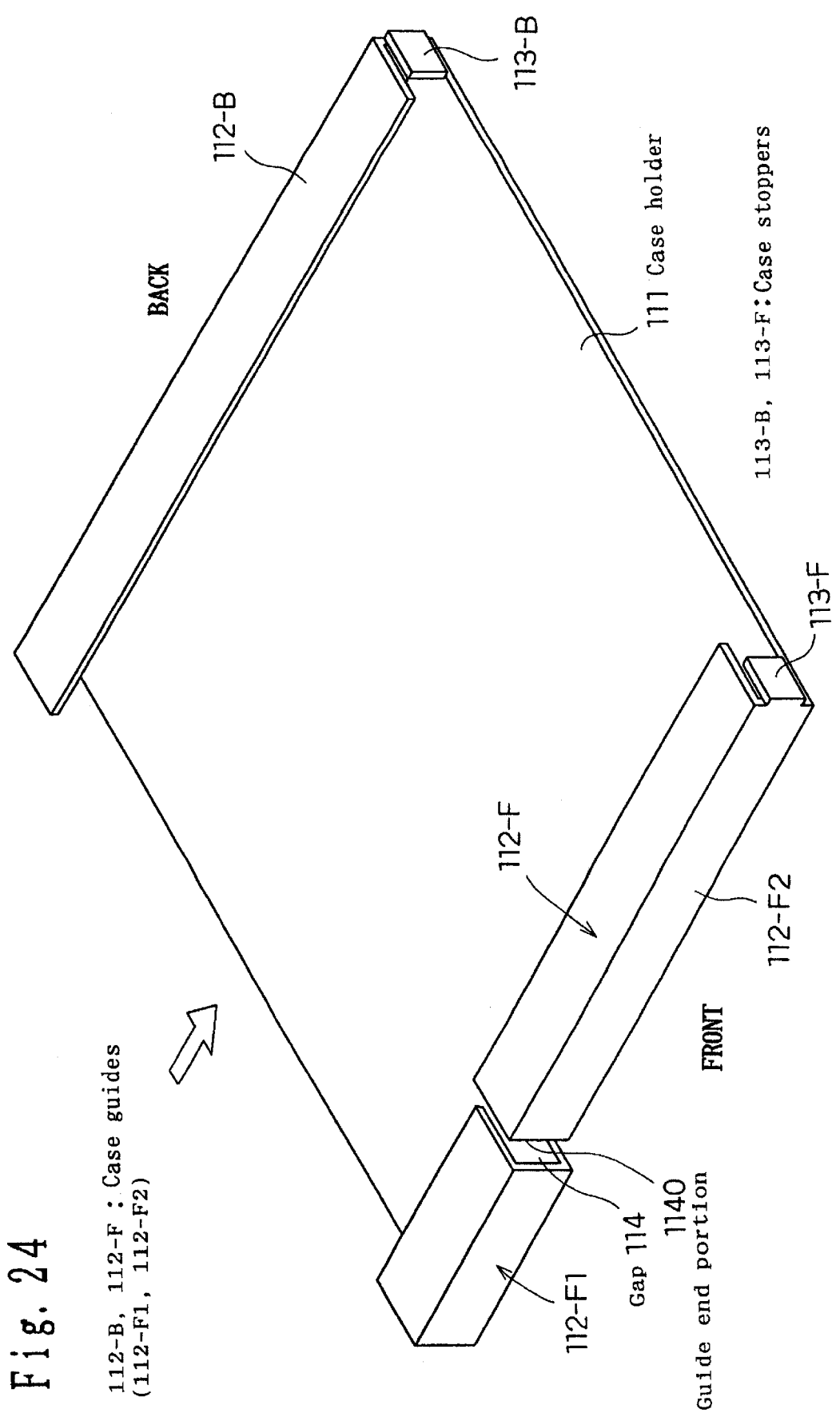
Figure 25:
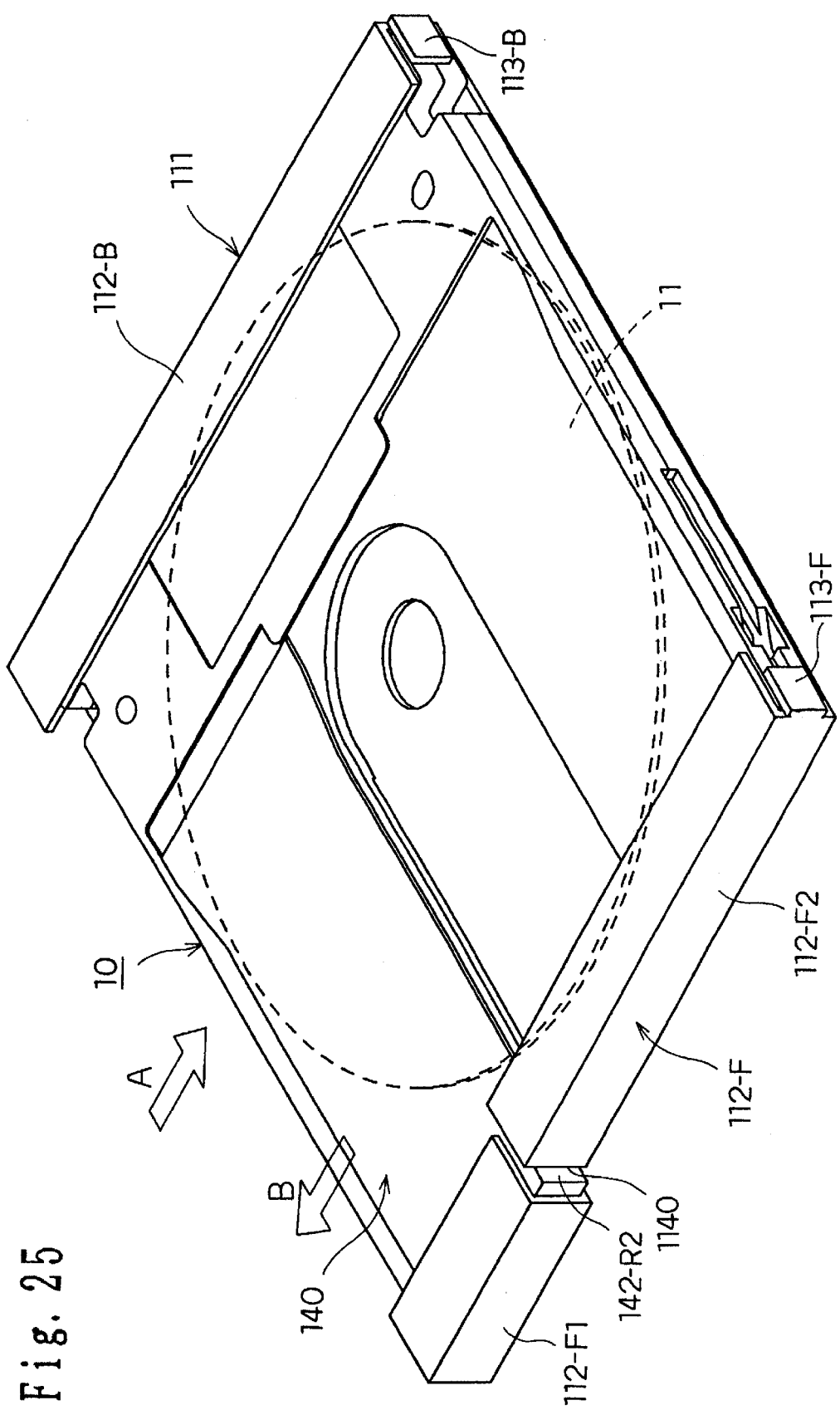
Figure 26:
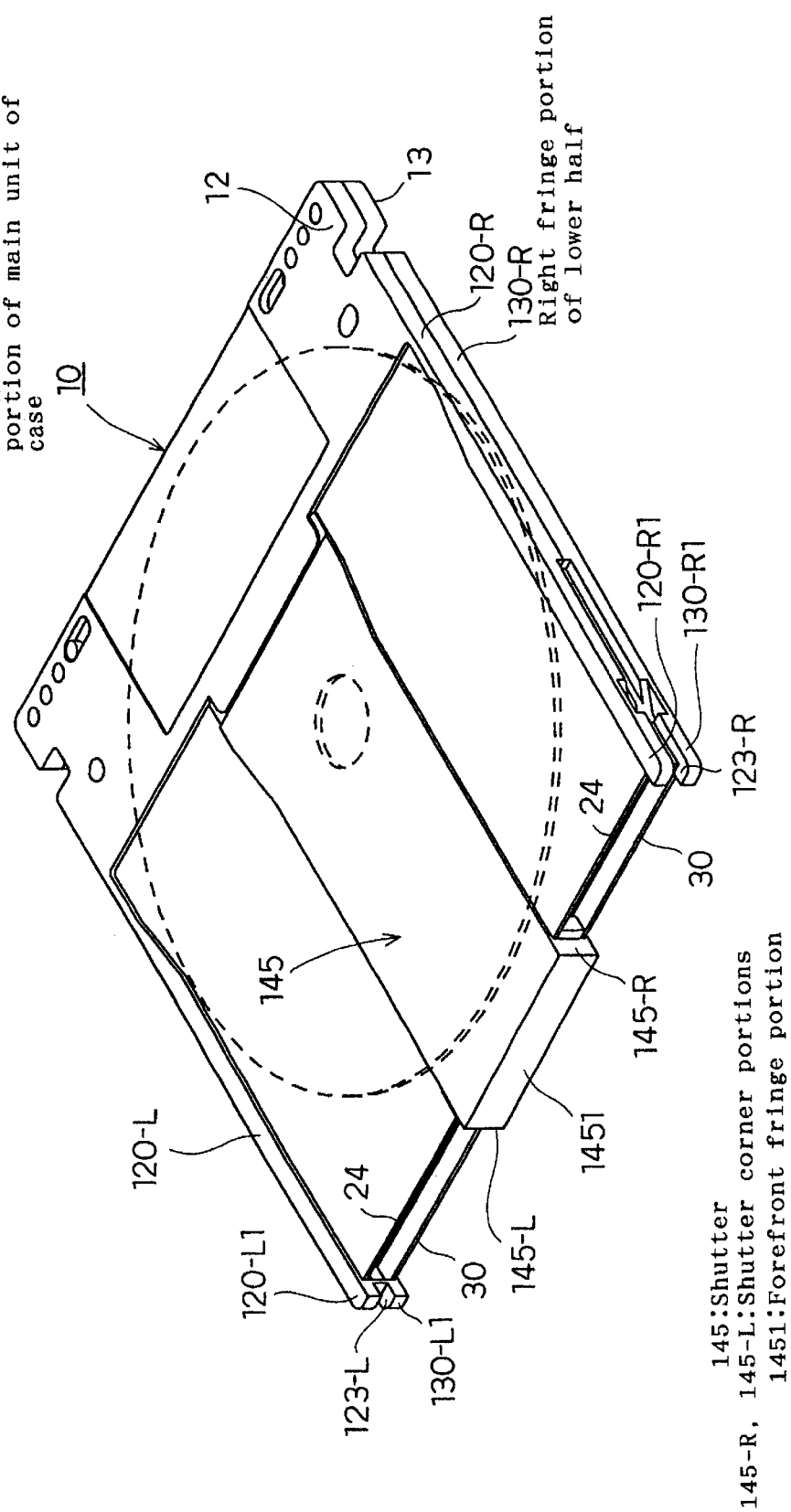
Figure 27:
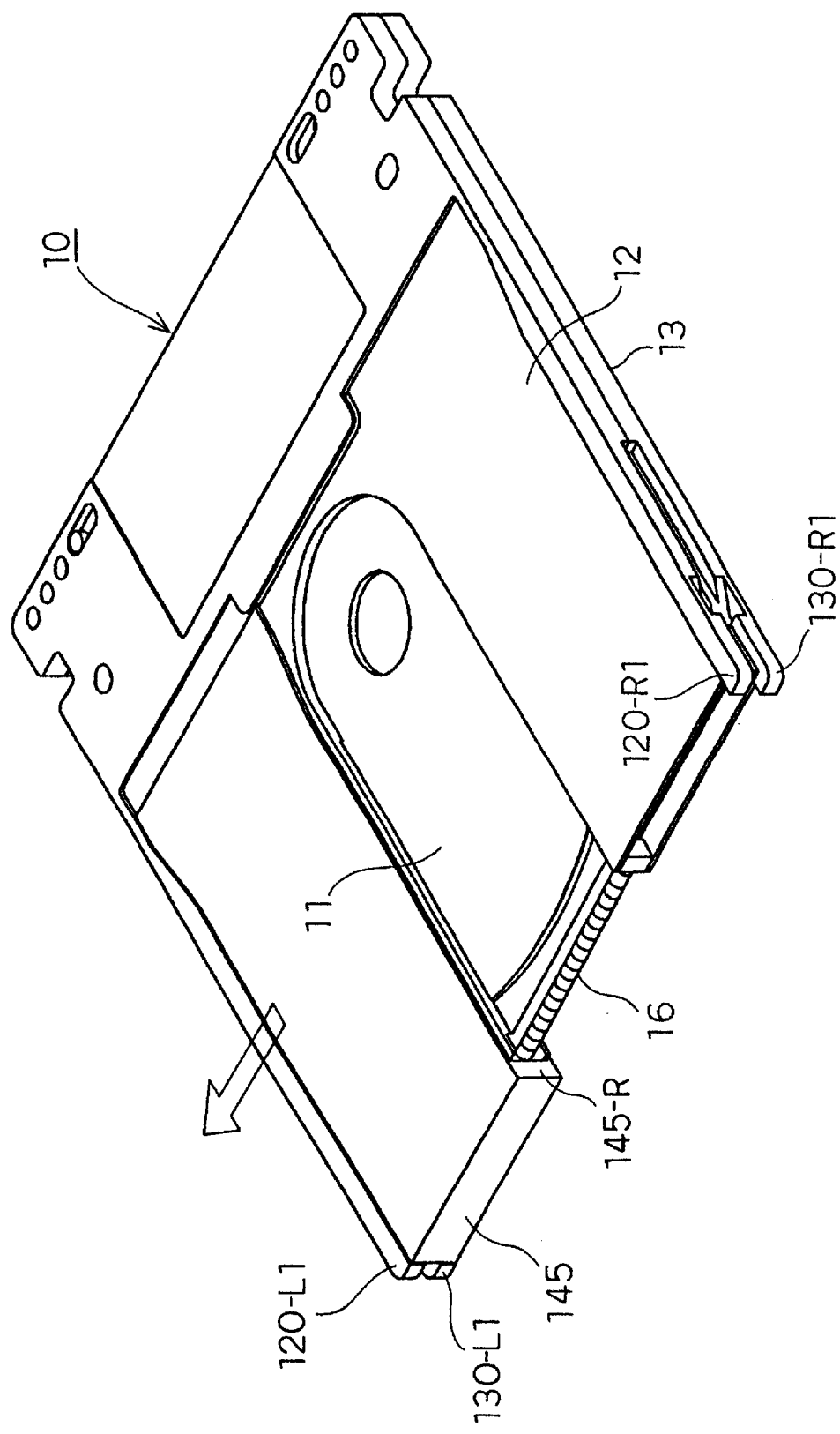
Figure 28:
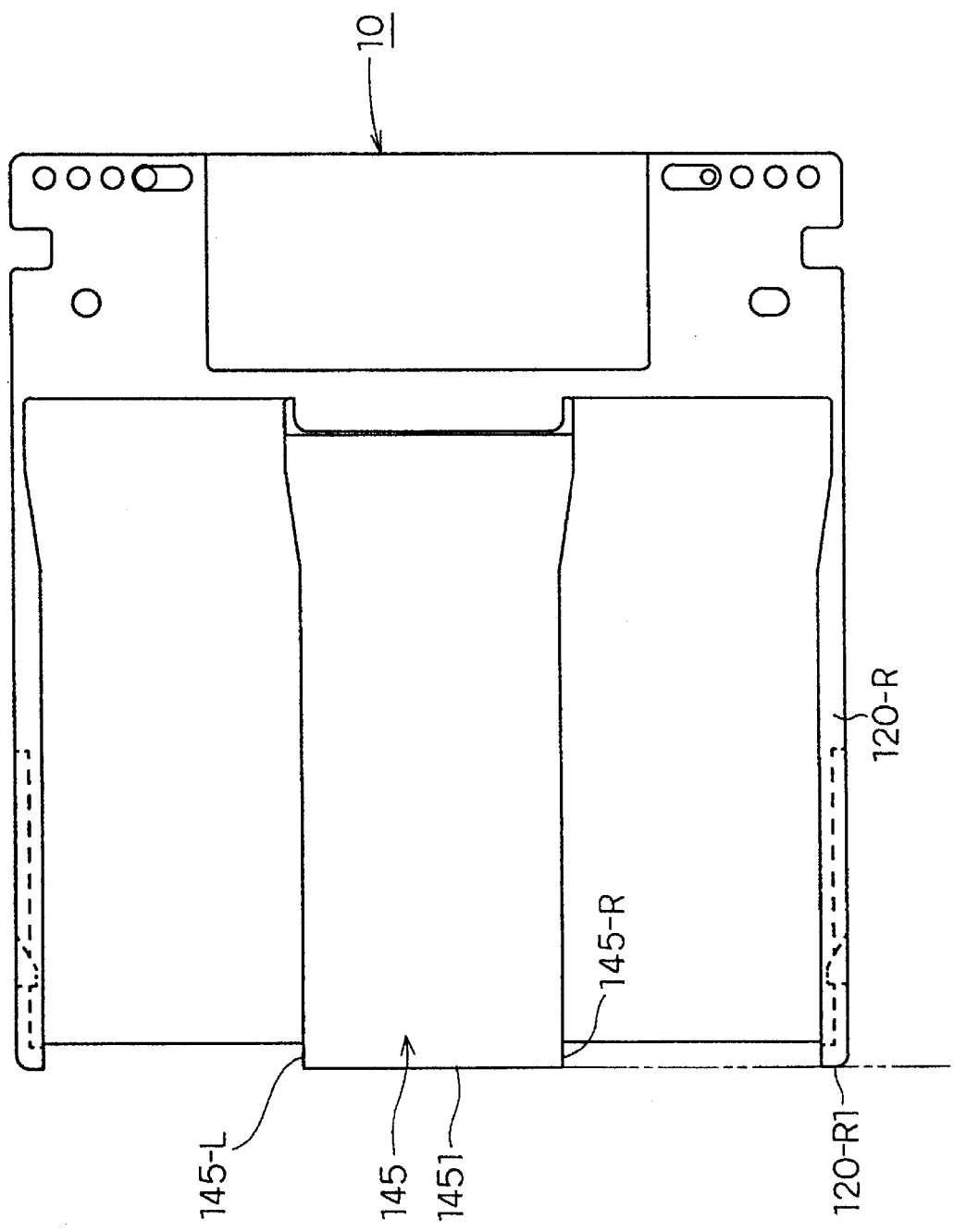
Figure 29:
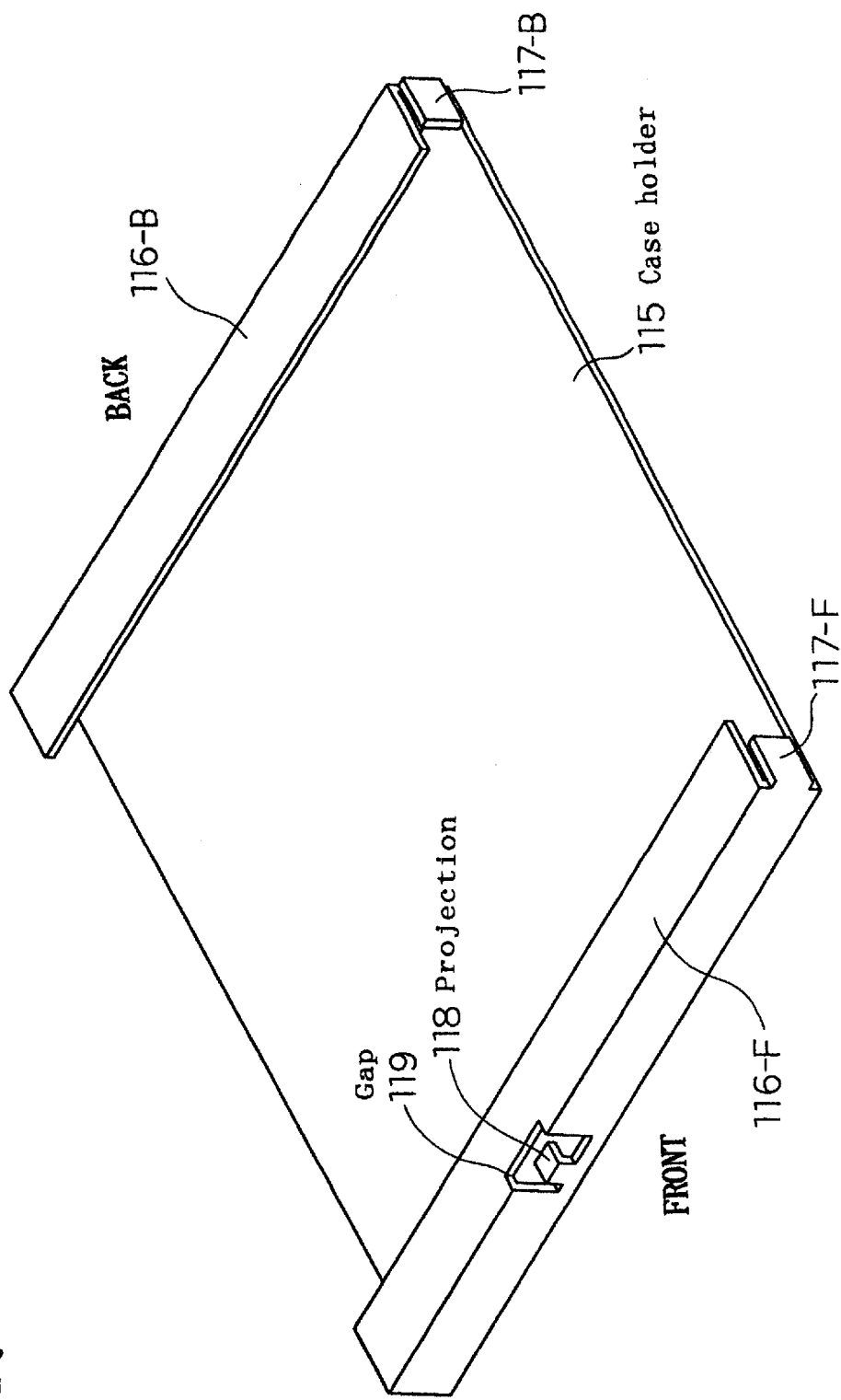
Figure 30:
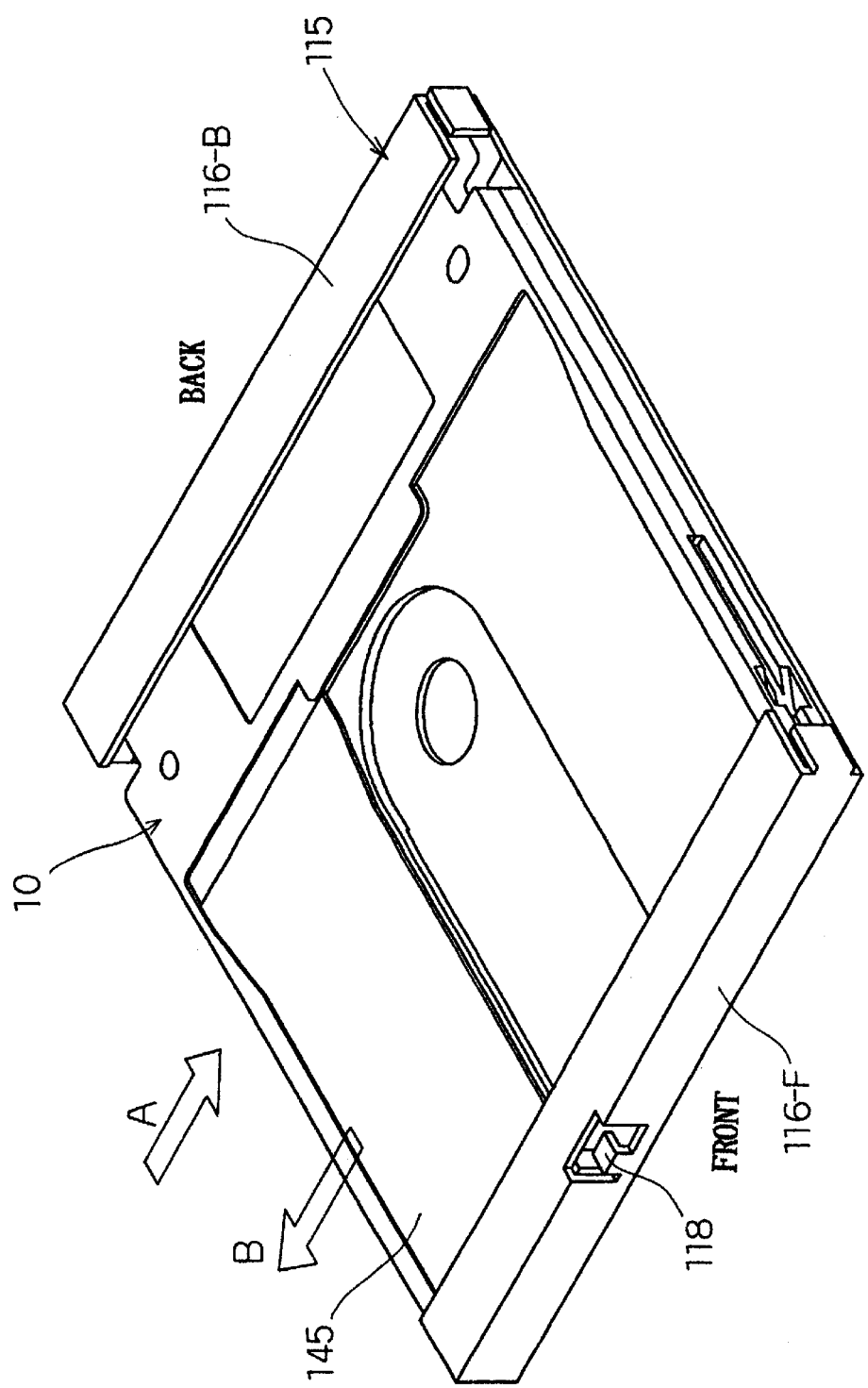

FIG. 17C is a view taken on line E—E of FIG. 17A;

FIG. 18 a perspective view showing a disc case 10 provided with a left driven hole 40-L and a right driven hole 40-R at the center in the thickness direction of the shutter 14;

FIG. 19 is a perspective view showing a disc case in accordance with a first embodiment of other embodiments of the present invention;

FIG. 20 is a perspective view showing the case shown in FIG. 19 with the shutter open;

FIG. 21 is a plan view showing the disc case shown in FIG. 19;

FIG. 22 is a perspective view showing a case holder for the disc case of the first embodiment of the other embodiments of the present invention;

FIG. 23 is a perspective view showing a condition wherein the disc case of the first embodiment is set in the holder shown in FIG. 22;

FIG. 24 is a perspective view showing another case holder for the disc case of the first embodiment of the other embodiments of the present invention;

FIG. 25 is a perspective view showing a condition wherein the disc case of the first embodiment of the other embodiments of the present invention is set in the case holder shown in FIG. 24;

FIG. 26 is a perspective view showing a disc case in accordance with a second embodiment of the other embodiments of the present invention;

FIG. 27 is a perspective view showing a condition wherein the shutter of the case shown in FIG. 26 is open;

FIG. 28 is a plan view showing the disc case 10 shown in FIG. 27;

FIG. 29 is a perspective view showing a case holder for the second embodiment of the other embodiments of the present invention; and FIG. 30 is a perspective view showing a condition wherein the disc case shown in FIG. 26 is set in the holder shown in FIG. 29.

Figure 31:
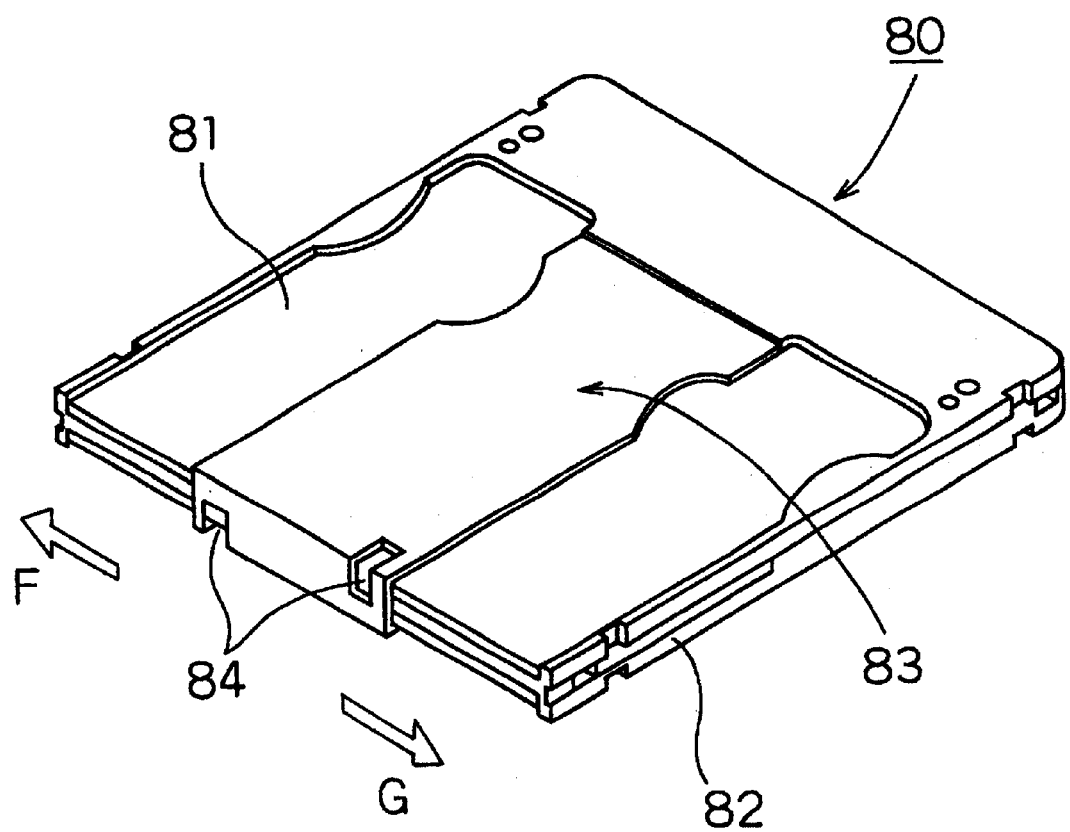

FIG. 31 is a perspective view showing a conventional disc case disclosed in Japanese Utility Model No. Hei 6-2132;

FIG. 32 is a perspective view showing the disc case shown in FIG. 31 exclusive of a shutter, a spring and slide members;

EXPLANATION OF REFERENCE CODES

10 Disc case
11 Disc
12 Upper half
13 Lower half
14 Shutter
15-L Left slide member
15-R Right slide member
16 Spring
17 Write protector
18 Accommodation chamber
19 Upper accommodation chamber
10 Top wall
21 Upper side surface
22 Upper opening
23 Upper concave portion
24 Upper front fringe portion
25 Lower accommodation chamber
26 Bottom surface
27 Lower side surface
28 Lower opening
29 Lower concave portion
28 Lower opening
29 Lower concave portion
30 Lower front fringe portion
31 Upper center end portion
32 Lower center end portion
33 Upper bridge portion
34 Upper surface
35 Lower bridge portion
36 Lower surface
37 Upper cover portion
38 Lower cover portion
39 Side wall portion
40-L Left driven hole
40-R Right driven hole
41-L Left driven hole
41-R Right driven surface
42-L Left engagement pawl portion
42-R Right engagement pawl portion
43-L Left engagement support portion
43-R Right engagement support portion
44 Rail
45-L Left fitting portion
45-R Right fitting portion
46 Upper surface
47 Lower surface
48 Engagement surface
49-L Left spring hook portion
50-L Left engagement pawl portion
51-L Left engagement support portion
52-L Left slide fitting portion
52-R Right slide fitting portion
53-L Left groove
54-L Left slide stop surface
55-L Left stop portion
56-L Left restriction groove
56-R Right restriction groove
57-L Left stop surface
57-R Right stop surface
58-L Left locking pawl 58-R Right locking pawl
59-L Left driven hole blocking portion
59-R Right driven hole blocking portion
60-R Right side wall surface
61 Shutter opening/closing means
62 Pin
63 Lower surface
64 Upper end portion
65 Lower end portion
66 Upper cutout
67 Lower cutout
68-L Left back surface
68-R Right back surface
101 Cartridge holder
102 Cartridge guide
103 Cartridge stopper
111 Cartridge holder
112-B, 112-F (112-F1, 112-F2) Cartridge guides
113-B, 113-F Cartridge stoppers
114 Gap
1140 Guide end portion
115 Cartridge holder
116-B, 116-F Left and right case guides
117-F, 117-B Cartridge stoppers
119 Gap
118 Projection
120-R Right fringe portion of upper half
120-R1 Right forefront fringe portion of upper half
120-L Left fringe portion of upper half
120-L1 Left forefront fringe portion of upper half
130-R Right fringe portion of lower half
130-R1 Right forefront fringe portion of lower half
130-L Left fringe portion of lower half
130-L1 Left forefront fringe portion of lower half
140 Shutter
141 Protrusion portion
1410 Forefront fringe portion
142-R Right step
142-L Left step
142-R1, 142-R2 Right step surfaces
142-L1, 142-L2 Left step surfaces
150-R Right slide member
145 Shutter
1451 Forefront fringe portion
145-R, 145-L Shutter corner portions
123-R, 124-L Gaps at right and left corner portions of front fringe portion of main unit of case
610 Shutter opener
611 Pin
612 Arm
613 Torsion spring
614 Positioning projection portion

PREFERRED EMBODIMENTS

Embodiments of the present invention are described below referring to the drawings.

A disc case in accordance with an embodiment of the present invention is described below referring to FIG. 1, a perspective view showing the disc case, and FIG. 2, a perspective view showing parts constituting the disc case. A disc case 10 accommodating a disc 11 shown in FIG. 1 comprises an upper half 12, a lower half 13, a shutter 14, a left slide member 15-L, a right slide member 15-R, a spring 16 and two write protectors 17 as shown in FIG. 2. The left slide member 15-L and the right slide member 15-R are mirror images of each other. Meawhile a disc cartridge comprises the disc case 10 and the disc 11.

Figure 1:
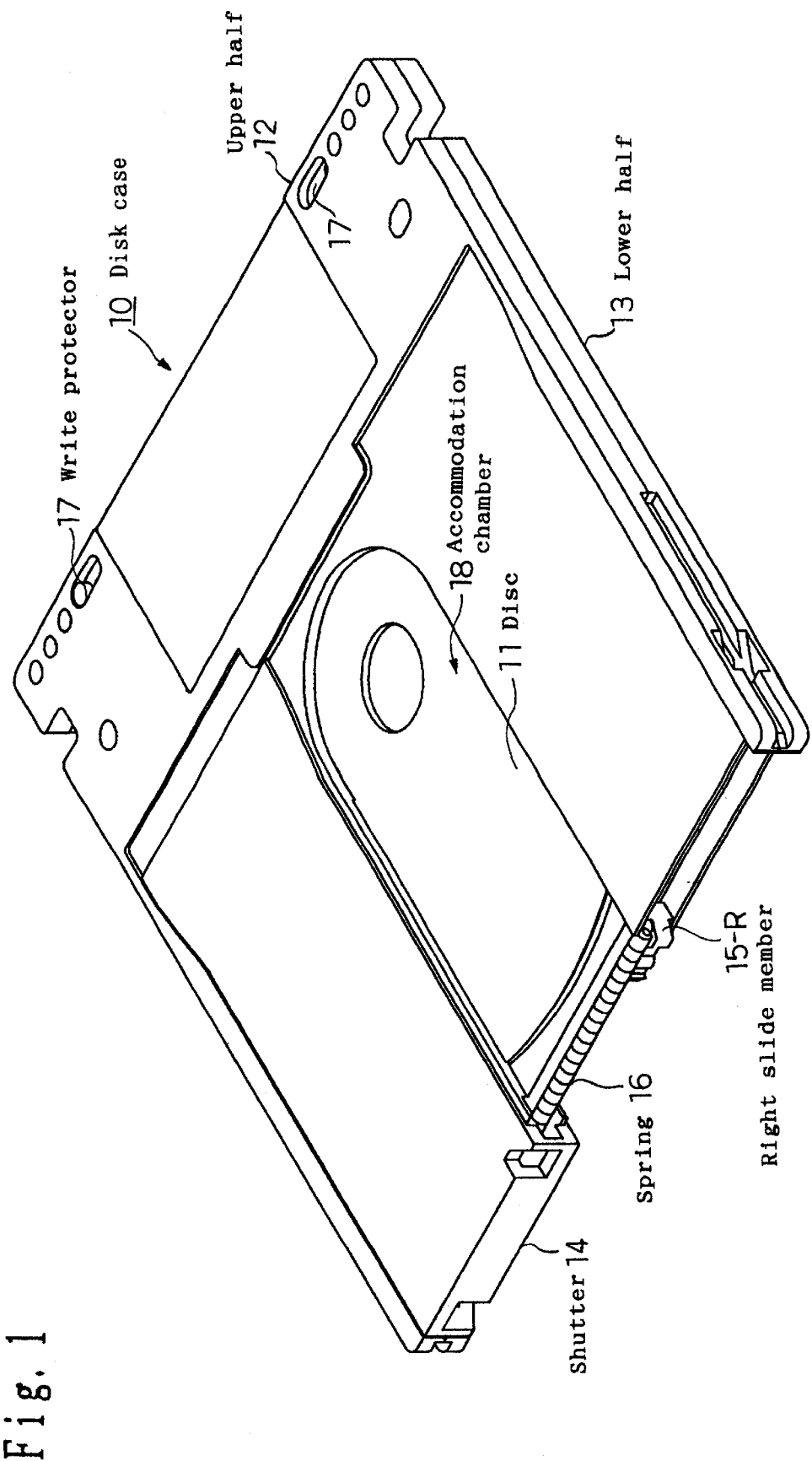
FIG. 1 is a perspective view showing a disc case in accordance with an embodiment of the present invention.
Figure 2:
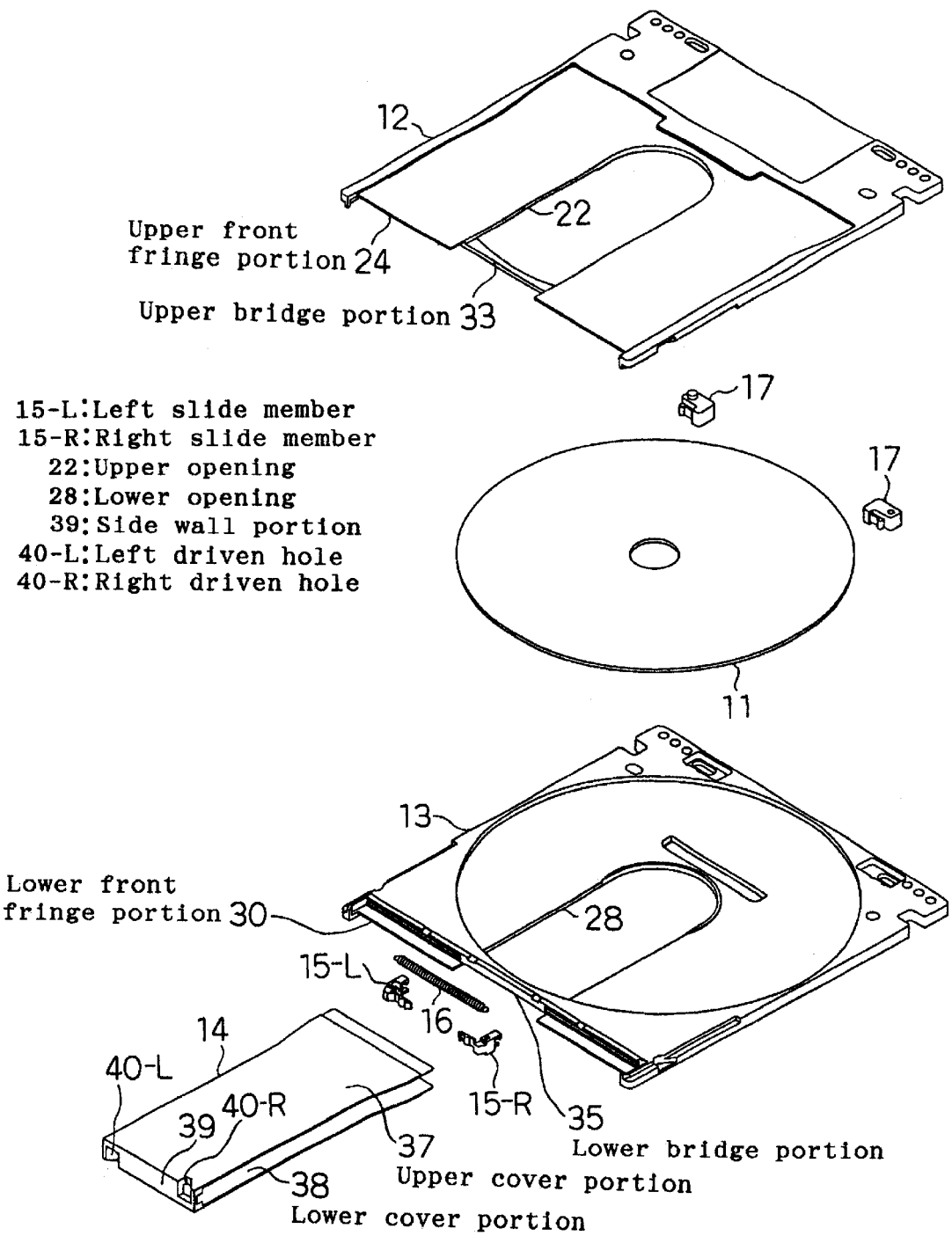
FIG. 2 is a perspective view showing parts constituting the disc case in accordance with the embodiment of the present invention.

Referring to FIG. 1, the upper half 12 and the lower half 13 constituting the main unit of the disc case 10 are each formed into a nearly plate-like rectangular solid by molding synthetic resin. An accommodation chamber 18 is formed in the disc case 10 so as to rotatably accommodate the disc 11. The disc 11 is an optical disc, and a signal recording surface capable of reading and writing signals is formed on both sides of the disc 11. Whether signals can be written or not on the signal recording surfaces of the disc 11 can be determined depending on the positions of the write protectors 17 corresponding to the signal recording surfaces. The main unit of the case 10 of the present invention comprises the upper half 12, the lower half 13, the left slide member 15-L, the right slide member 15-R, the spring 16 and the two write protectors 17 exclusive of the shutter 14.

Figure 3:
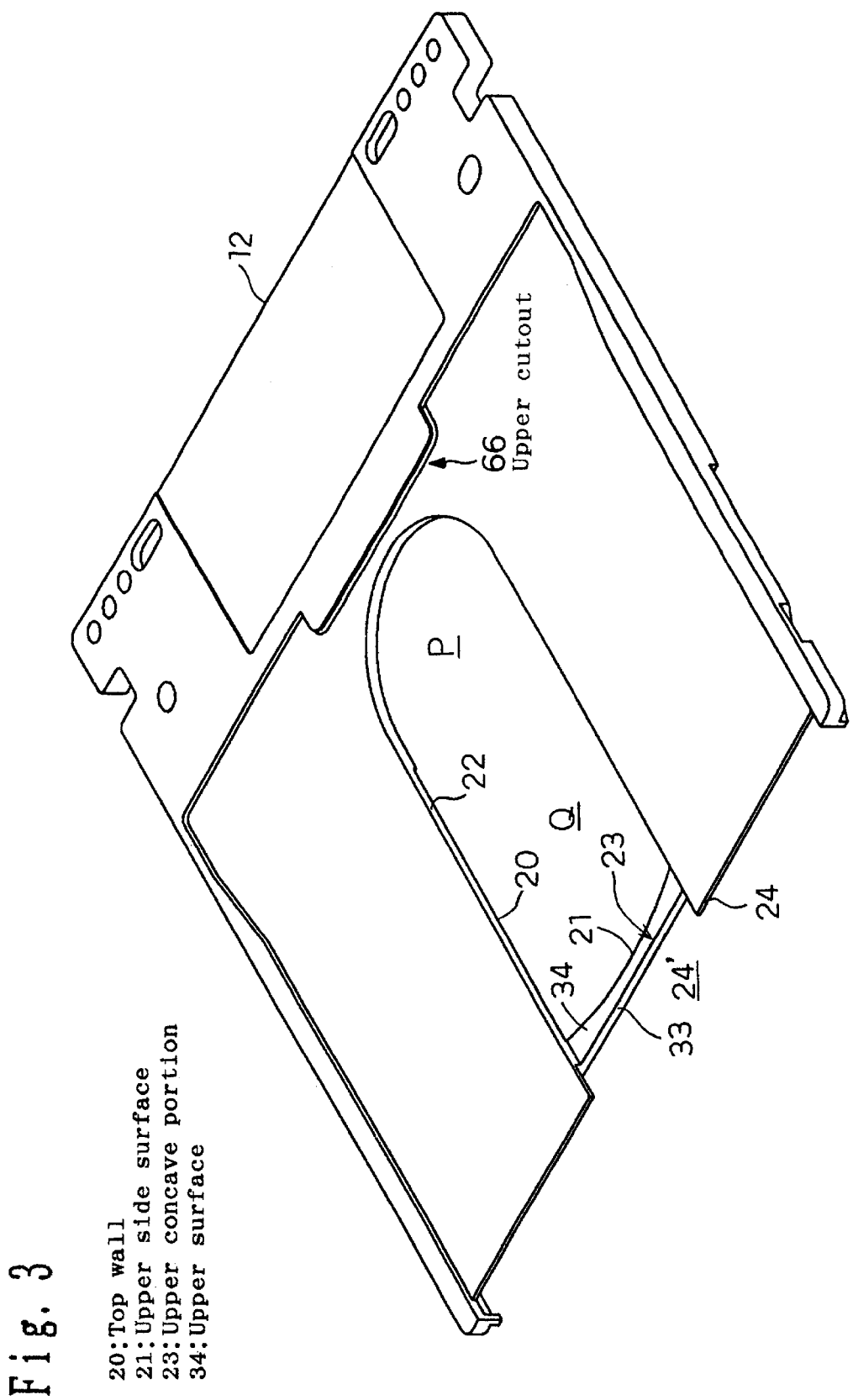
FIG. 3 is a perspective view showing the outer surface of an upper half 12.
Figure 5:
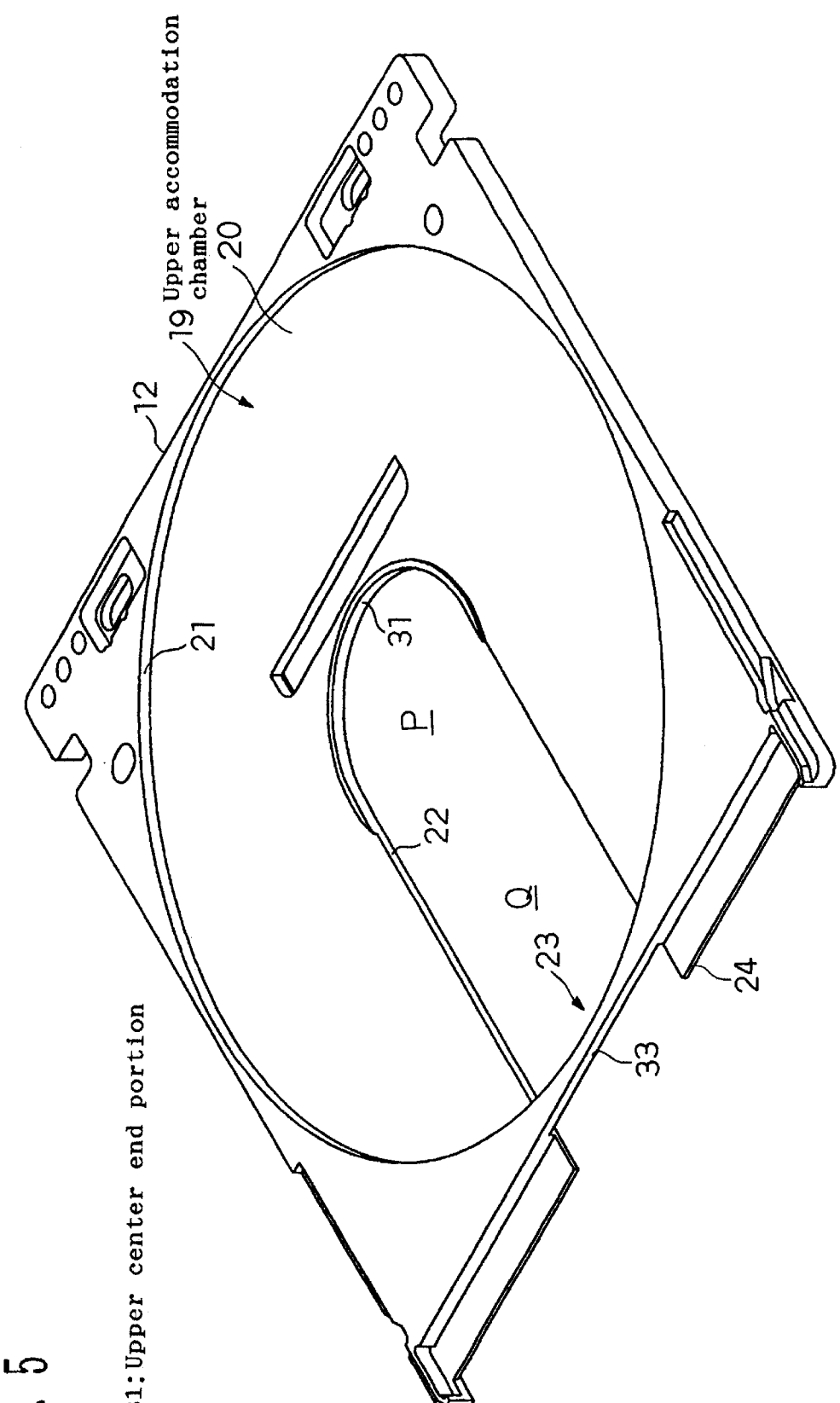
FIG. 5 is a perspective view showing the inner surface of the upper half 12 constituting the upper half of an accommodation chamber 18.

The upper half 12 constituting the upper half portion of the accommodation chamber 18 of the disc case 10 in accordance with the present embodiment is described below referring to FIG. 3, a perspective view showing the outer surface of the upper half 12, and FIG. 5, a perspective view showing the inner surface thereof. In addition, the lower half 13 constituting the lower half portion of the accommodation chamber 18 is described below referring to FIG. 6, a perspective view showing the inner surface of the lower half 13, and FIG. 7, a perspective view showing the outer surface thereof. Referring to FIG. 5, on the inner surface side of the upper half 12 constituting the upper half portion of the main unit of the disc case 10, an upper accommodation chamber 19 is formed as a tray-shaped concave area so as to substantially follow the contour of the disc 11. This upper accommodation chamber 19 constitutes the upper half portion of the accommodation chamber 18. Numeral 20 represents a circular top wall of the upper accommodation chamber 19, and numeral 21 represents a cylindrical upper side surface of the upper accommodation chamber 19. The top wall 20 is partially cut to form an upper opening 22 as described below.

Furthermore, referring to FIG. 6, on the inner surface side (the upper side in FIG. 6) of the lower half 13 constituting the lower half portion of the main unit of the disc case 10, a lower accommodation chamber 25 is formed as a tray-shaped concave area so as to substantially follow the contour of the disc 11. This lower accommodation chamber 25 constitutes the lower half portion of the accommodation chamber 18. Numeral 26 represents a circular bottom wall of the lower accommodation chamber 25, and numeral 27 represents a cylindrical lower side surface of the lower accommodation chamber 25. The bottom wall 26 is partially cut to form a lower opening 28 as described below.

Accordingly, the accommodation chamber 18 is formed by abutting and securing the upper half 12 and the lower half 13 with each other so that the upper side surface 21 of the upper accommodation chamber 19 and the lower side surface 27 of the lower accommodation chamber 25 form a single cylindrical side surface (the side surface of the entire accommodation chamber 18). In this way, the accommodation chamber 18 comprises the upper accommodation chamber 18 and the lower accommodation chamber 25.

Next, the upper opening 22 of the upper half 12 is described below. Referring to FIGS. 3 and 5, the upper half 12 is provided with the upper opening 22 formed by partially cutting the circular top wall 20 as described above so that a chucking member (including a disc table) can externally pressure-contact the disc 11 and so that an optical head (not shown) for reading and writing signals on the signal recording surface of the disc 11 can gain access to the signal recording surface. The upper opening 22 ranges from the central portion of the top wall 20 to the upper side surface 21 on the side of the upper front fringe portion 24. The shape of the upper opening 22 is described as follows: the upper central portion 31 (P) of the upper opening 22 positioned at the central portion of the top wall 20 is circular, and the portion (Q) of the upper opening 22 ranging from the center of the central portion to the upper side surface 21 on the side of the upper front fringe portion 24 is nearly rectangular.

Figure 7:
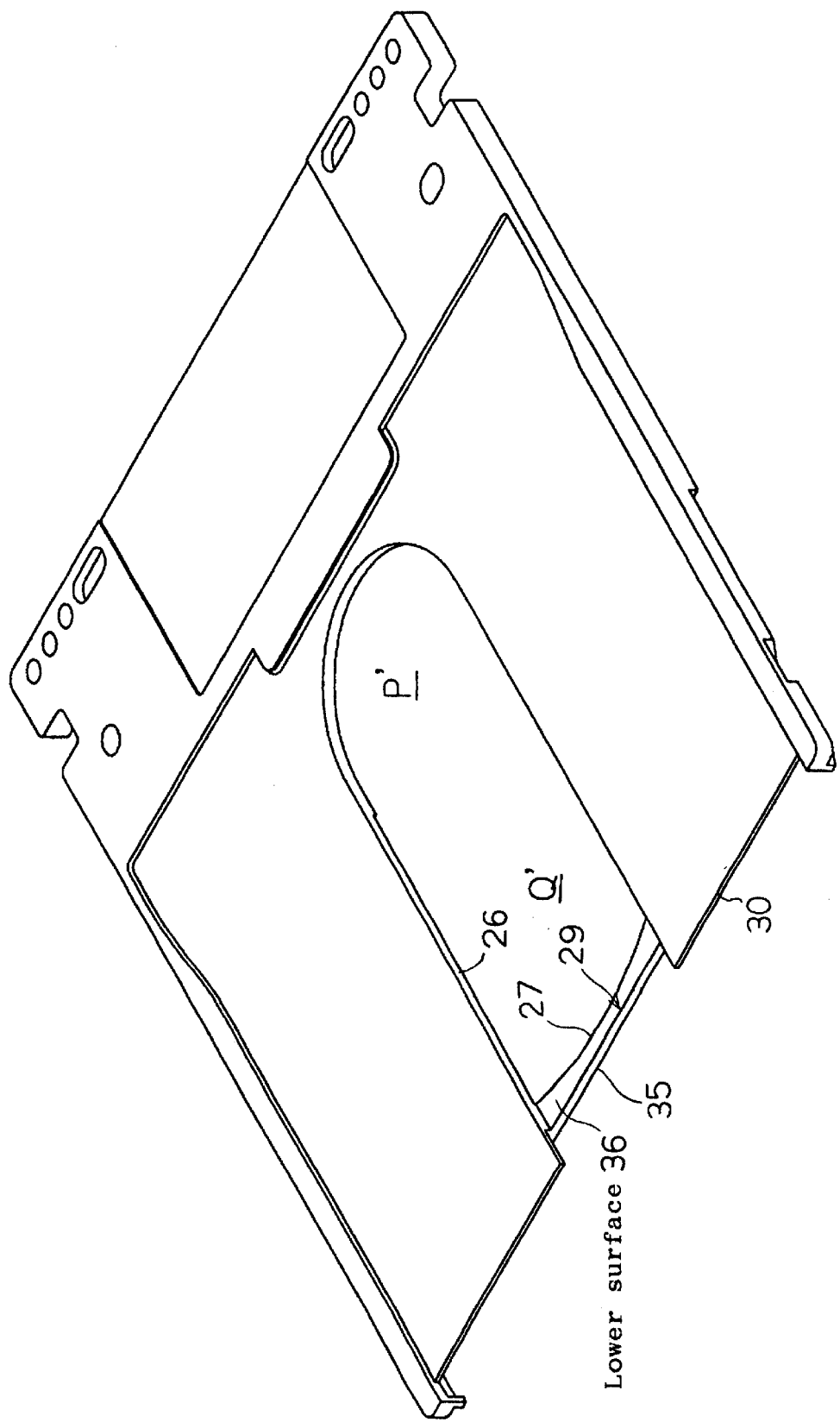
FIG. 7 is a perspective view showing the outer surface of the lower half 13 constituting the lower half of the accommodation chamber 18.

Furthermore, the lower opening 28 of the lower half 13 is described below. Referring to FIGS. 6 and 7, the lower half 13 is provided with the lower opening 28 formed in the circular bottom wall 26 as described above so that a chucking member (including a disc table) can externally pressure-contact the disc 11 and so that an optical head for reading and writing signals on the signal recording surface of the disc 11 can gain access to the signal recording surface. The lower opening 28 ranges from the central portion of the bottom wall 26 to the lower side surface 27 on the side of the lower front fringe portion 30. The shape of the lower opening 28 is described as follows: the lower central portion 32 (P') of the lower opening 28 positioned at the central portion of the bottom wall 26 is circular, and the portion (Q') of the lower opening 28 ranging from the center of the central portion to the lower side surface 27 on the side of the lower front fringe portion 30 is nearly rectangular.

The following describe the relationships among the upper opening 22, the lower opening 28, support member access openings and a head access opening in accordance with the present invention. The circular portion formed at the circular upper central portion 31 of the upper opening 22 and the circular portion formed at the circular lower central portion 32 of the lower opening 28 correspond to the support member access openings in the disc case 10 of the present invention, the support member access openings being formed to allow the chucking member to externally pressure-contact the disc 11. Furthermore, a portion exclusive of a portion corresponding to the support member access opening from the upper opening 22 or the lower opening 28 corresponds to the head access opening of the present invention.

Figure 4:
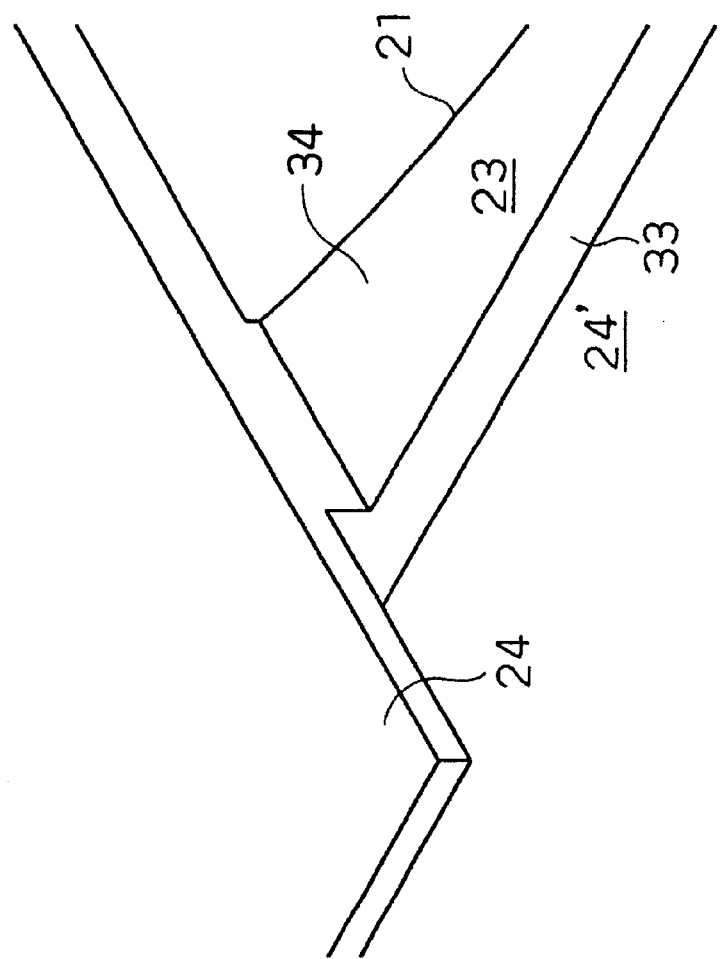
FIG. 4 is an enlarged perspective view mainly showing the bridge portion of the outer surface of the upper half 12.
Figure 8:
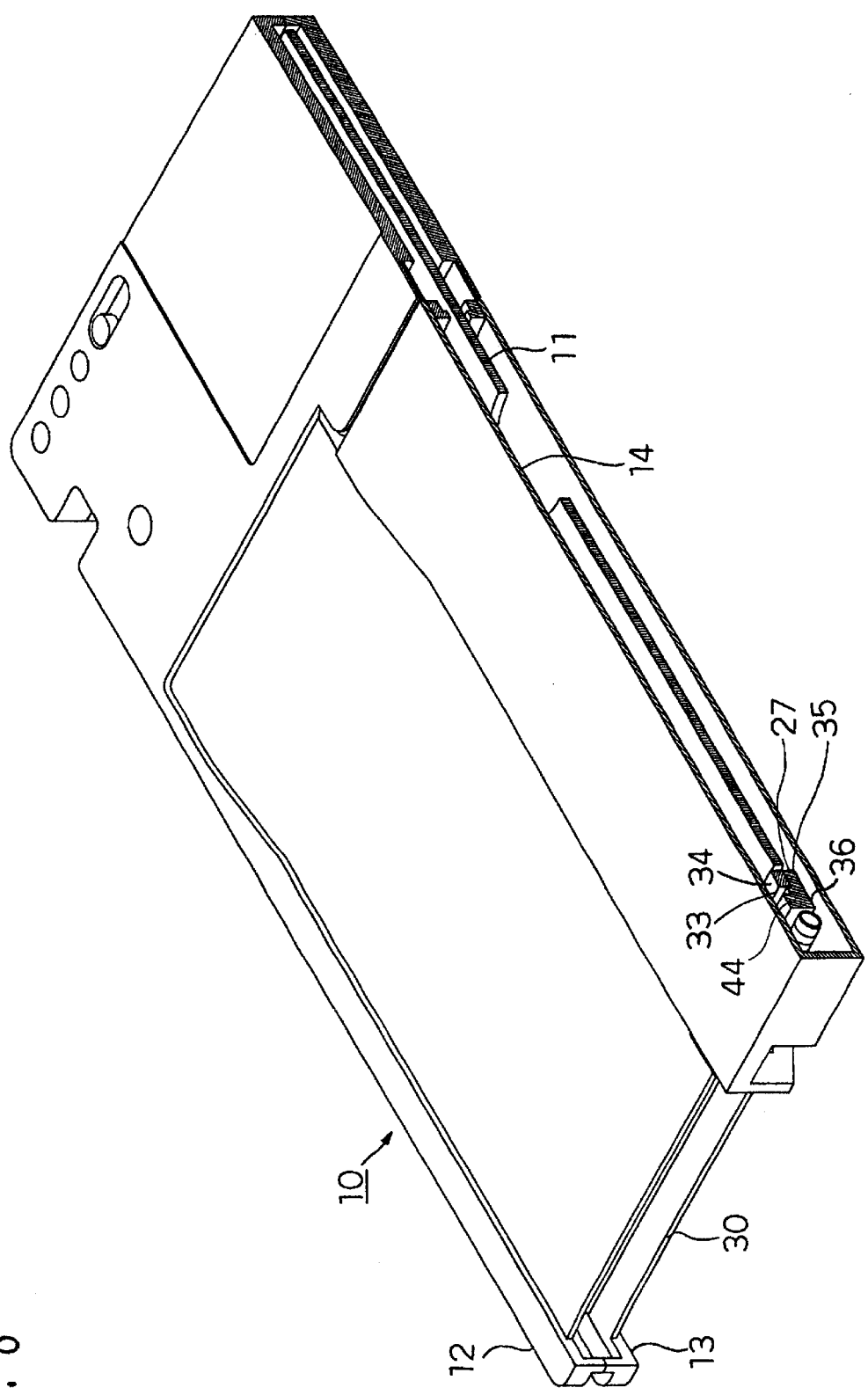
FIG. 8 is a half vertical sectional view showing a disc case 10 accommodating a disc 11.
Figure 9:
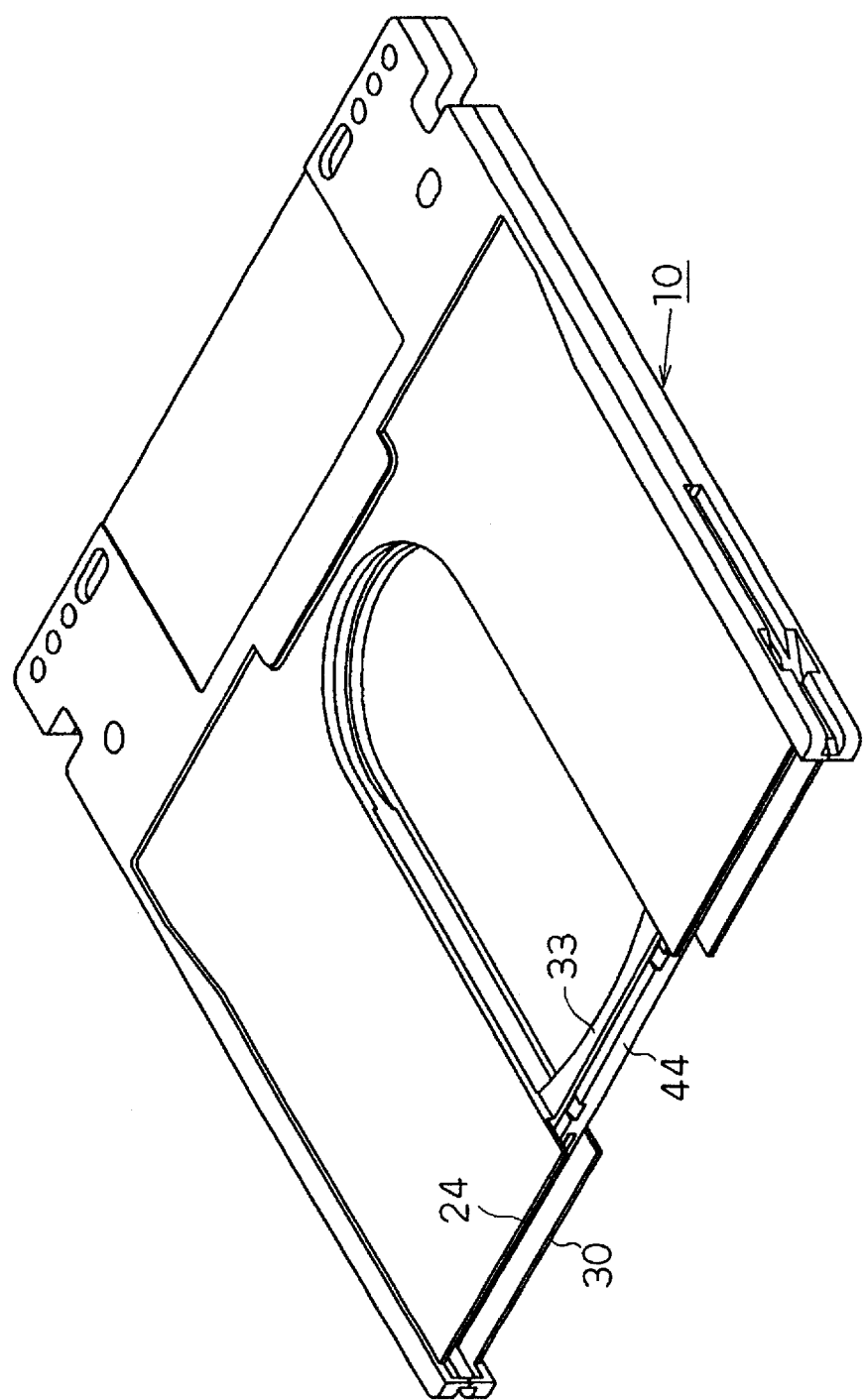
FIG. 9 is a perspective view showing the disc case 10 accommodating the disc 11 exclusive of a shutter, a spring and slide members.
Figure 10:
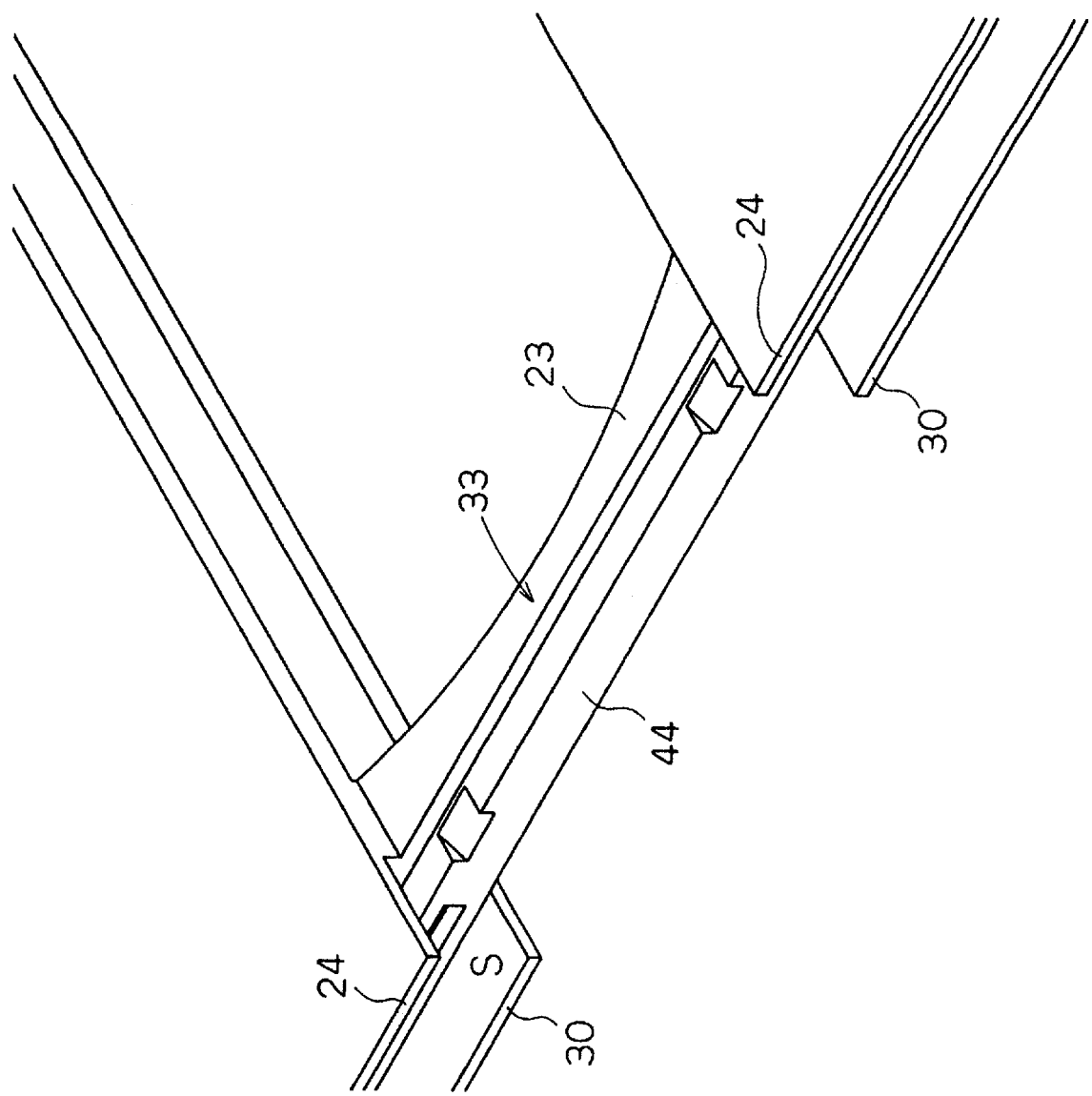
FIG. 10 is an enlarged perspective view showing the bridge portion and so on of the disc case.

The concave portion of the present embodiment is described below referring to FIG. 3, a perspective view showing the outer surface of the upper half 12, FIG. 4, a magnified view showing the concave portion, FIG. 5, a perspective view showing the inner surface of the upper half 12, FIG. 8, a vertical sectional perspective view showing the disc case 10 accommodating the disc 11, FIG. 9, a perspective view similar to the assembly drawing of FIG. 1 exclusive of the shutter 14, the slide members 15 and the spring 16, and FIG. 10, an enlarged perspective view showing the bridge portion and so on of the disc case. Referring to FIG. 3, an upper bridge portion 33 forming a part of the upper side surface 21 is disposed near the central portion of the upper front fringe portion 24 of the upper half 12. In addition, the upper surface 34 of the upper bridge portion 33 is recessed deeper than the lower (inner) surface of the top wall 20 of the upper half 12 (see the upper bridge portion 33 shown in FIG. 3). A space 24' is formed on the side of the upper front fringe portion 24 from the upper bridge portion 33.

Referring to FIGS. 6 and 7, a lower bridge portion 35 forming a part of the circular lower side surface 27 is disposed near the central portion of the lower front fringe portion 30 of the lower half 13. The lower surface 36 of the lower bridge portion 35 on the outer surface side of the lower half 13 is recessed deeper than the upper (inner) surface of the bottom wall 26 of the lower half 13. In addition, as shown in FIG. 6, a rail 44 is formed on the upper surface (inner surface) of the lower bridge portion 35 near the lower front fringe portion 30. On the front side of the rail 44, a left restriction groove 56-L is formed on the left, and a right restriction groove 56-R is formed on the right on the front side of the rail 44. Furthermore, on the upper surface 46 of the rail 44, a left slide fitting portion 52-L, a left fitting portion 45-L, a right fitting portion 45-R and a right slide fitting portion 52-R are disposed in this order from left to right. FIG. 12B is a sectional view taken on line B—B of FIG. 6 and is a sectional perspective view showing the rail 44 in more detail.

The upper concave portion 23 and the lower concave portion 29 in accordance with the present embodiment correspond to the concave portion of the disc case of the present invention. These concave portions are provided so as to decrease a dropping distance when the disc case is loaded into a recording and/or reproducing apparatus (player) and dropped onto the disc table of the apparatus.

Next, the shutter in accordance with the present embodiment is described below. Referring to FIG. 2, the shutter 14 is formed by molding synthetic resin. The shutter 14 comprises an upper cover portion 37, a lower cover portion 38, both being formed into a nearly rectangular plate-like shape, and a side wall portion 39 disposed at the end portions of the upper cover portion 37 and the lower cover portion 38 so as to connect the upper cover portion 37 to the lower cover portion 38 so that the shutter 14 can cover areas ranging from the upper opening 22 of the upper half 12 to the lower opening 28 of the lower half 13 while covering the upper bridge portion 33 disposed near the central portion of the upper front fringe portion 24 and the lower bridge portion 35 disposed near the central portion of the lower front fringe portion 30.

The shutter 14 is described below in more detail referring to FIG. 11, a partially cutaway view showing the shutter 14. At both ends of the side wall portion 39 of the shutter 14, a left driven hole 40-L and a right driven hole 40-R are formed so that the shutter 14 can be driven by shutter opening/closing means described later. The shutter 14 covering the upper opening 22, the lower opening 28 and the like can be opened when the shutter opening/closing means pushes a right driven surface 41-R, namely one of the side surfaces defining the right driven hole 40-R, in the direction toward the left driven hole 40-L. In the same way, the shutter 14 covering the upper opening 22, the lower opening 28 and the like can be opened when the shutter opening/closing means pushes a left driven surface 41-L (see FIG. 16A), namely one of the side surfaces defining the left driven hole 40-L, in the direction toward the right driven hole 40-R.

Furthermore, the shutter 14 is equipped with a left engagement pawl portion 42-L and a right engagement pawl portion 42-R having engagement pawls inside and near both ends of the side wall portion 39 of the shutter 14. The shutter 14 is connected to the main unit of the disc case 10 by virtue of the left engagement pawl portion 42-L and the right engagement pawl portion 42-R. The left engagement pawl portion 42-L and the right engagement pawl portion 42-R project from the inside of the side wall portion 39 toward the accommodation chamber 18. Moreover, the left engagement pawl portion 42-L is positioned on the upper side of the left driven hole 40-L, and the right engagement pawl portion 42-R is positioned on the upper side of the right driven hole 40-R. In order to support the connection of the left engagement pawl portion 42-L and the right engagement pawl portion 42-R to the main unit of the disc case 10, the shutter 14 is equipped with a left engagement support portion 43-L and a right engagement support portion 43-R, both being plate-like, inside and near both end portions of the side wall portion 39 of the shutter 14. These left engagement support portion 43-L and the right engagement support position 43-R project from the inside of the side wall portion 39 toward the accommodation chamber 18. In addition, the left engagement support portion 43-L is positioned on the lower side of the left driven hole 40-L, and the right engagement support portion 43-R is positioned on the lower side of the right driven hole 40-R.

Among the slide members in accordance with the present embodiment, the left slide member 15-L is first described below referring to FIG. 12A, a perspective view showing the left slide member 15-L, FIG. 12B, a sectional view taken on line B—B of FIG. 6, and FIG. 12C, a magnified view taken near the left slide member 15-L when the shutter 14 covers the upper opening 22, the lower opening 28 and the like. Referring to FIG. 12A, the left slide member 15-L is provided with a left spring hook portion 49-L for hooking the spring 16 shown in FIG. 2. In addition, the left slide member 15-L is equipped with a left engagement pawl portion 50-L having an engagement pawl for engaging the main unit of the disc case 10, more specifically an engagement surface 48 (see FIG. 12B, and FIG. 14, a sectional view taken on line A—A of FIG. 6) of the rail 44 provided near the lower front fringe portion 30 of the lower half 13. Furthermore, the left slide member 15-L is provided with a plate-like left engagement support portion 51-L for supporting the engagement at the left engagement pawl portion 50-L. Moreover, the left slide member 15-L is provided with a left locking pawl 58-L for engaging the left back surface 68-L of the left driven surface 41-L of the left driven hole 40-L formed in the shutter 14 (see FIG. 12C and FIG. 16A).

In the same way as described above, a right slide member 15-R in accordance with the present embodiment is described below referring to FIG. 13A, a perspective view showing the right slide member 15-R, FIG. 13B, a sectional view taken on line C—C of FIG. 6, and FIG. 13C, a magnified view taken near the right slide member 15-R when the shutter 14 covers the upper opening 22, the lower opening 28 and the like. The right slide member 15-R is also provided with a right spring hook portion 49-R for hooking the spring 16. In addition, the right slide member 15-R is equipped with a right engagement pawl portion 50-R for engaging the rail 44 and a plate-like right engagement support portion 51-R for supporting the engagement at the right engagement pawl portion 50-R. Moreover, the right slide member 15-R is also provided with a right locking pawl 58-R for engaging the right back surface 68-R of the right driven surface 41-R of the right driven hole 40-R formed in the shutter 14 (see FIGS. 16A and 16B). The other portions of the right slide member are similar to those of the left slide member.

The slide members are provided with shielding portions to prevent dust from entering the accommodation chamber 18. Referring to FIG. 12A, the left slide member 15-L is provided with a left driven hole blocking portion 59-L having the shape of a cylindrical side wall and constituting a portion of blocking the left driven hole 40-L of the shutter 14. In the same way, as shown in FIG. 13C, the right slide member 15-R is provided with a right driven hole blocking portion 59-R having the shape of a cylindrical side wall and constituting a portion for blocking the right driven hole 40-R of the shutter 14.

In addition, as shown in FIG. 12C, the left side member 15-L is provided with a left side wall surface 60-L to block a gap generated between the side surface of the shutter 14 near the left driven hole 40-L and a slit S (refer to S in FIG. 10) between the upper front fringe portion 24 and the lower front fringe portion 30. In the same way, the right slide member 15-R is provided with a right side wall surface 60-R to block a gap generated on the side surface of the shutter 14 near the right driven hole 40-R.

The following describes the assembly of all the members of the disc case in accordance with the present embodiment and also describe the functions of the major members thereof.

First, the following describe the incorporation of the slide members into the main of the disc case 10. Before installing the left slide member 15-L and the right slide member 15-R in the main unit of the disc case 10, one end of the spring 16 is hooked to the left spring hook portion 49-L of the left side member 15-L, and the other end of the spring 16 is hooked to the right spring hook portion 49-R of the right slide member 15-R.

Referring to FIGS. 12A and 12B, the left slide member 15-L is then incorporated into the main unit of the disc case 10 as described below. First, the left engagement pawl portion 50-L of the left slide member 15-L is pushed from the upper surface 46 of the rail 44 to the accommodation chamber 18 along the left side fitting portion 52-L formed on the rail 44 of the lower half 13 while being elastically deformed upward. At the same time, the left engagement support portion 51-L of the left slide member 15-L is inserted into a left groove 53-L defined by the lower surface 47 of the rail 44 and the inner surface (upper surface) of the lower half 13 (see FIG. 12B). At this time, a convex left stop portion 55-L on the left slide member 15-L is inserted into the left restriction groove 56-L formed in the rail 44 as shown in FIG. 12B.

As a result, the left slide member 15-L is fit into the rail 44, and slidably incorporated into the main unit of the disc case 10. In the same way, the right slide member 15-R is incorporated into the main unit of the disc case 10 along the right slide fitting portion 52-R (see FIGS. 6, 13A and 13B). However, these slide members have different slidable regions. Referring to FIG. 6, the left slide member 15-L slides along a part of the rail 44 provided on the left side of the lower bridge portion 35, and the right slide member 15-R slides along a part of the rail 44 provided on the right side of the lower bridge portion 35.

Next, the shutter 14 is incorporated into the main unit of the disc case 10 as described below. Referring to FIG. 6, the rail 44 in parallel with the lower front fringe portion 30 is formed near the lower front fringe portion 30 of the lower half 13 as described above. The left fitting portion 45-L and the right fitting portion 45-R are formed near both ends of the lower bridge portion 35. As shown in FIG. 11, the left fitting portion 45-L is used to fit the left engagement pawl portion 42-L of the shutter 14 into the rail 44, and the right fitting portion 45-R is used to fit the right engagement pawl portion 42-R into the rail 44. Referring to FIGS. 6, 7 and 11, in order to incorporate the shutter 14 into the main unit of the disc case 10, the left engagement pawl portion 42-L and the right engagement pawl portion 42-R of the shutter 14 are pushed from the upper surface 46 of the rail 44 to the accommodation chamber 18 along the left fitting portion 45-L and the right fitting portion 45-R while being elastically deformed upward. At the same time, the left engagement support portion 43-L and the right engagement support portion 43-R are pushed from the lower surface 47 of the rail 44 to the accommodation chamber 18 while being elastically deformed downward (see FIG. 6, and FIG. 14, a sectional view taken on line A—A of FIG. 6; the front fringe portion 30 of the lower half 13 is not present under an area of the lower surface 47 of the rail 44 corresponding to a range provided with the left fitting portion 45-L and the right fitting portion 45-R). As a result, the shutter 14 is fit into the rail 44 and installed into the rail 44 formed on the lower half 13, thereby incorporated into the main unit of the disc case 10.

Figure 11:
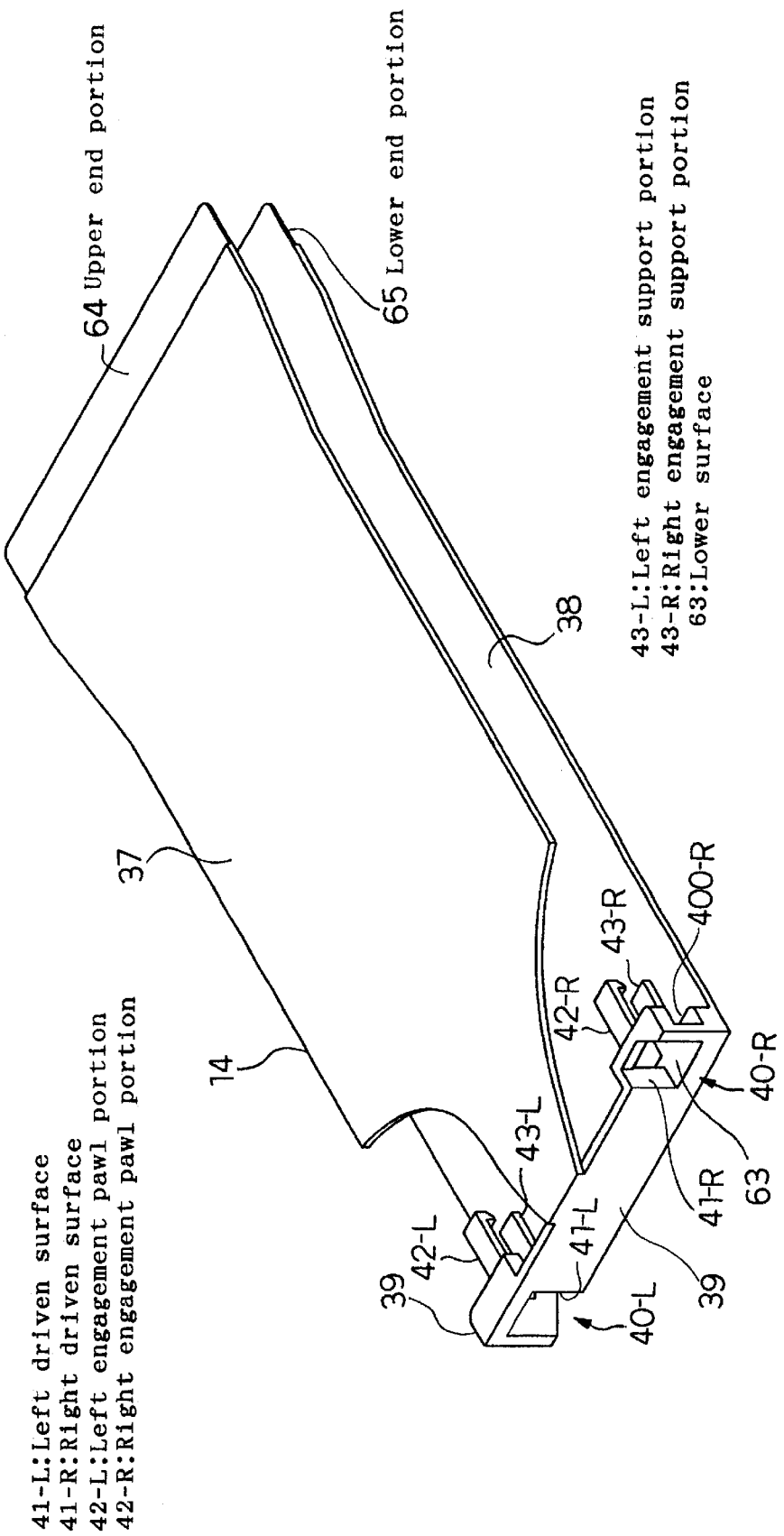
FIG. 11 is a partially cutaway view showing a shutter 14.

In this condition, the left engagement pawl 42-L and the right engagement pawl 42-R engage the engagement surface 48 of the rail 44 as shown in FIGS. 11 and 14. In addition, the upper surface of the left engagement support portion 43-L and the upper surface of the right engagement support portion 43-R make contact with the lower surface 47 of the rail 44 so as to support the engagement of the left engagement pawl portion 42-L and the right engagement pawl portion 42-R. As a result, once the shutter 14 is incorporated into the main unit of the disc case 10, the shutter 14 does not slip off spontaneously.

The function of the spring 16 is then described below. The left slide member 15-L and the right slide member 15-R installed in the lower half 13 as described above tend to come close to each other because of the shrinkage force of the spring 16 secured to the left spring hook portion 49-L and the right spring hook portion 49-R. However, as shown in FIG. 12A, the convex left stop portion 55-L having a left slide stop surface 54-L is formed on the left slide member 15-L. The convex left stop portion 15-L is inserted in the left restriction groove 56-L formed in the rail 44 shown in FIG. 12B. The right end of the left restriction groove 56-L terminates at the left stop surface 57-L as shown in FIG. 6. Since the left slide stop surface 54-L of the left slide member 15-L is thus prevented from moving further by the left stop surface 57-L of the rail 44, the left slide member 15-L cannot slide further toward the right slide member 15-R. In the same way, since the right slide stop surface 54-R of the right slide member 15-R is prevented from moving further by the right stop surface 57-R of the rail 44, the right slide member 15-R cannot slide further toward the left slide member 15-L. For this reason, the left slide member 15-L and the right slide member 15-R are positioned at both ends of the lower bridge portion 35 if no external force is applied.

In this condition, the left stop surface 57-L and the right stop surface 57-R in accordance with the present embodiment are used as stoppers for the disc case of the present invention.

The following describe a mechanism for locking the shutter 14 by using the slide members. Referring to FIGS. 11, 12A and 12C, the left slide member 15-L is provided with the left locking pawl 58-L for engaging the left back surface 68-L of the left driven surface 41-L of the left driven hole 40-L formed in the shutter 14 (also see FIG. 16A). In the same way, the right slide member 15-R is provided with a right locking pawl 58-R for engaging the right back surface 68-R of the right driven surface 41-R of the right driven hole 40-R formed in the shutter 14 (see FIGS. 13A, 13C and 16A).

As described above, the left slide member 15-L and the right slide member 15-R are first fit into the rail 44, and positioned at both ends of the lower bridge portion 35 by the action of the spring 16. In this condition, the shutter 14 is fit into the rail 44 as described above. As a result, the left locking pawl 58-L of the left slide member 15-L engages the left back surface 68-L of the left driven surface 41-L of the shutter 14, and the right locking pawl 58-R of the right slide member 15-R engages the right back surface 68-R of the right driven surface 41-R of the shutter 14. In this way, the shutter 14 is locked and cannot slide. The left stop surface 57-L, the right stop surface 57-R, the left fitting portion 45-L, the right fitting portion 45-R, the left locking pawl 58-L, the right locking pawl 58-R, etc. are configured in terms of position and size so that the left locking pawl 58-L and the right locking pawl 58-R accurately engage the left back surface 68-L of the left driven surface 41-L and the right back surface 68-R of the right driven surface 41-R, respectively, when the shutter 14 is fit into the rail 44 as described above.

Next, the opening/closing operation of the shutter 14 of the disc case 10 in accordance with the present embodiment is described below referring to FIGS. 15A and 16A, views showing a condition wherein the shutter 14 is closed; and FIGS. 15B and 16B, views showing a condition wherein the shutter 14 is open. Referring to FIGS. 15A and 16A, when the shutter 14 covers the upper opening 22 and the like of the disc case 10, since the left locking pawl 58-L of the left slide member 15-L engages the left back surface 68-L of the left driven surface 14-L of the shutter 14 as described above, the shutter 14 cannot move in the direction indicated by arrow L. In the same way, since the right locking pawl 58-R of the right slide member 15-R engages the right back surface 68-R of the right driven surface 41-R of the shutter 14, the substrate 14 cannot move in the direction indicated by arrow R, either.

When the disc case 10 is loaded into a signal recording and/or reproducing apparatus (not shown), a pin 62 installed at the tip of shutter opening/closing means 61 provided in the apparatus is inserted into the right driven holder 40-R, while the pin 62 is in parallel with the surface of the disc 11 and the tip of the pin 62 contacts a lower surface 63, namel one of the surfaces of the right driven hole 40-R (see FIG. 11). Furthermore, the tip of the pin 62 inserted into the right driven hole 40-R pushes the right driven hole blocking position 59-R of the right slide member 15-R toward the accommodation chamber 18. This pushing force releases the engagement at the right locking pawl 58-R of the right slide member 15-R from the right back surface 68-R of the right driven surface 41-R of the right driven hole 40-R. As a result, the shutter 14 can move only in the direction indicated by arrow L (see FIG. 16B).

The disc case 10 is then loaded further into the above-mentioned apparatus. Therefore, the pin 62 of the shutter opening/closing means 61 further pushes the right driven hole blocking portion 59-R toward the accommodation chamber 18, while the engagement release condition is maintained. However, the pin 62 cannot further push and move the right driven hole blocking portion 59-R because of the restriction at the right driven hole 40-R of the shutter 14. Therefore, the pin 62 is rotated in the direction indicated by arrow C, thereby opening the shutter 14. Eventually, the shutter 14 is opened in the direction indicated by arrow L (see FIG. 15B). In the same way, the shutter 14 can also be opened in the direction indicated by arrow R, when the shutter opening/closing means 61 is disposed upside down and when the pin 62 thereof is inserted into the left driven hole 40-L.

The condition shown in FIG. 15B is described below in more detail. Although the right slide member 15-R is pulled by the spring 16 in the direction indicated by arrow L, since the right slide stop surface 54-R (see FIG. 13A) of the right slide member 15-R interferes with the right stop surface 57-R (see FIG. 6) of the rail 44, the right slide member 15-R cannot move further in the direction indicated by arrow L. On the other hand, the right side surfaces 500L (see FIG. 12A) of the left engagement pawl portion 50-L and the left engagement support portion 51-L of the left slide member 15-L push the left surfaces (see FIG. 11) of the left engagement pawl portion 42-L and the left engagement support portion 43-L of the shutter 14 in the direction indicated by arrow R by the force of the spring 16. While the force of the spring 16 is applied as described above, the shutter opening/closing means 61 operated to open the shutter 14 keeps pushing the right driven surface 41-R of the right driven hole 40-R by using the pin 62, thereby retaining the open condition of the shutter 14.

The following describe how the disc case 10 being in the above-mentioned condition is taken out of the apparatus (player). Referring to FIG. 15B, a force is applied to the shutter opening/closing means 61 in the direction opposite to the direction indicated by arrow C (see FIG. 15A) by a spring, a motor or the like. As the disc case 10 is taken out of the apparatus, the shutter opening/closing means 61 is rotated in the direction opposite to the direction indicated by arrow C by the force applied in the opposite direction. However, the force in the direction indicated by arrow R has been applied to the shutter 14 by the spring 16 as described above. Therefore, the shutter 14 is moved in the direction indicated by arrow R, while following the movement of the shutter opening/closing means 61 which is rotated in the direction opposite to the direction indicated by arrow C, thereby covering the upper opening 22 and the like. When the shutter 14 has returned to the condition shown in FIG. 15A, the left locking pawl 58-L of the left slide member 15-L engages the left back surface 68-L of the left driven surface 41-L of the shutter 14, and the right locking pawl 58-R of the right slide member 15-R engages the right back surface 68-R of the right driven surface 41-R of the shutter 14, thereby locking the shutter 14 (see FIGS. 11, 12 and 16).

Next, the dustproof effect at the disc case 10 in accordance with the present embodiment is described below referring to FIG. 17A, a perspective view showing the shutter 14 positioned to cover the upper opening 22 and the like of the disc case 10, FIG. 17B, a sectional view taken on line D—D of FIG. 17A, and FIG. 17C, a sectional view taken on line E—E of FIG. 17A.

The problem encountered in the convenient disc case is further clarified as described below referring to FIGS. 17A, 17B and 8.

The conventional disc case is not provided with the right slide member 15-R shown in FIG. 17A. Therefore, dust can enter the interior of the shutter 14 through the right driven hole 40-R of the shutter 14. In addition, dust can enter the interior of the shutter 14 through an opening 400-R (see FIG. 11) provided at the right end portion of the shutter 14 near the right driven hole 40-R. Furthermore, dust can enter the interior of the shutter 14 through the slit S (see FIG. 10) defined by the front fringe portion 24 of the upper half 12 and the front fringe portion 30 of the lower half 13. Dust having entered the interior of the shutter 14 from the above-mentioned openings and slit can further enter the accommodation chamber 18 through the upper concave portion 23 of the bridge portion 33 or the lower concave portion 29 of the bridge portion 35 in the direction indicated by arrow F or G shown in FIG. 17B (see FIG. 8). Moreover, dust can either the accommodation chamber 18 through the left side of the shutter 14 in the same way.

In the case of the disc case 10 in accordance with the present embodiment, however, the right driven hole 40-R is blocked with the right driven hole blocking portion 59-R of the right slide member 15-R as shown in FIG. 17A. Additionally, the opening 400-R provided at the right end portion of the shutter 14 near the right driven hole 40-R is blocked by the right side wall surface 60-R of the right slide member 15-R (see FIG. 13C). Besides, the slit S (see FIG. 10) defined by the front fringe portion 24 of the upper half 12 and the front fringe portion 30 of the lower half 13 is also blocked by the right side wall surface 60-R of the right slide member 15-R. Therefore, dust cannot enter the interior of the shutter 14.

In the same way, the left driven hole 40-L is blocked with the left driven hole blocking portion 59-L of the left slide member 15-L. Additionally, the opening 400-L (see FIG. 12C) provided at the left end portion of the shutter 14 near the left driven hole 40-L is blocked with the left side wall surface 60-L of the left slide member 15-L. Besides, the slit S (see FIG. 12C) defined by the front fringe portion 24 of the upper half 12 and the front fringe portion 30 of the lower half 13 is also blocked by the left side wall surface 60-L of the left slide member 15-L. Therefore, dust cannot enter the interior of the shutter 14 in the case of the case in accordance with the present invention.

Next, dust entry from the shutter 14 positioned at the central portion of the disc case is also prevented as described below. Referring to FIG. 17C, a holding flange 600 is provided to hold down the upper end portion 64 and the lower end portion 65 of the shutter 14. The holding flange 600 is made by providing an upper cutout 66 in the upper half 12 and by providing an lower cutout 67 in the lower half 13. Accordingly, dust may enter from the upper cutout 66 and the lower cutout 67. However, when the shutter 14 covers the upper opening 22 and the like of the disc case 10, the upper end portion 64 of the shutter 14 enters the upper cutout 66 so as to block the upper cutout 66. In the same way, when the shutter 14 covers the lower opening 28 and the like of the disc case 10, the lower cutout 67 is blocked with the lower end portion 65 of the shutter 14.

Consequently, when the shutter 14 covers the upper opening 22, the lower opening 28 and the like of the disc case 10, the accommodation chamber 18 is completely blocked.

Although the left locking pawl 58-L and the right locking pawl 58-R are provided to lock the shutter 14 in the above-mentioned embodiment, it is not always necessary to provide a mechanism for locking the shutter 14. In case such a mechanism is unnecessary, the left driven hole blocking portion 59-L of the left slide member 15-L and the right driven hole blocking portion 59-R of the right slide member 15-R are also unnecessary. Furthermore, the left and right driven holes 40-L and 40-R of the shutter 14 are also unnecessary.

Still another embodiment is shown in FIG. 18. In other words, referring to FIG. 18, by providing the left driven hole 40-L and the right driven hole 40-R at the center in the thickness direction of the shutter 14, the step difference between the end surfaces H and I can be decreased or eliminated.

New embodiments (hereinafter referred to as other embodiments) are described below. The new embodiments are characterized in that the shutter 14 thereof is not locked and that when a disc case in accordance with the embodiments is set into a player, the disc case can be inserted into a holder both in the back-and-forth direction and the lateral direction.

FIG. 19 is a perspective view showing a disc case in accordance with a first embodiment of the other embodiments. FIG. 20 is a perspective view showing the disc case shown in FIG. 19 with the shutter open. FIG. 21 is a plan view showing the disc case shown in FIG. 19. As a rule, members similar to those used in the above-mentioned embodiments are represented by the same numerals, and not explained in detail. The first embodiment differs from the above-mentioned embodiment in that the shutter 140, the slide members 150-R and 150-L of the first embodiment are not provided with any locking mechanism as described above and that the front fringe portion of the shutter 140 projects.

(1) Since the disc case in accordance with the present embodiment has no locking mechanism, the shutter 140 being closed will open when an object hits the shutter 140. However, the structure of the disc case is made simple.

(2) The following mainly describe the feature wherein the disc case can be inserted into a holder both in the back-and-forth direction and in the lateral direction.

(a) As obviously shown in FIG. 20, in the first embodiment, a protrusion portion 141 is formed at the central position of the front fringe portion of the shutter 140, and steps 142-R and 142-L are formed at both corner portions of the projection portion 141. As shown in FIG. 21, the forefront fringe portion 1410 of the protrusion portion 141 is located at the position indicated by chain line B with respect to the forward direction (the shutter 140 slides along the front fringe portion of the main unit of the case). The forefront fringe portions 120-R1 and 120-L1 of the right fringe portion 120-R and the left fringe portion 120-L of the upper half 12 of the main unit of the case are located at the position indicated by chain line C. Furthermore, the surfaces 142-R1 and 142-L1 (see FIG. 20) of the steps 142-R and 142-L of the shutter 140, being in parallel with the above-mentioned slide direction, are located at the position indicated by chain line A. As shown in FIG. 21, chain line B is located at the most forward position, chain line A is located at the most backward position, and chain line C is located therebetween. The forefront fringe portions 130-R1 and 130-L1 of the right fringe portion 130-R and the left fringe portion 130-L of the lower half 13 are also located in the same way.

At least the forefront fringe portion 1410 (the forefront fringe portion of the protrusion portion 141) of the shutter 140 is required to be protruded more forward than the forefront fringe portions 120-R1, 120-L1, 130-R1 and 103-L1 of the main unit (12, 13) of the case. The parallel surface 142-R1 of the step 142-R of the shutter 140 is located behind the forefront fringe portions 120-R1, 120-L1, 130-R1 and 130-L1 because of the following reason. In case the parallel surface is located behind the forefront fringe portions, the tip 1140 of a shutter opener described below interferes with the front portion of the step 142-R and cannot push a surface 142-R2 which is orthogonal to the slide direction. The above-mentioned configuration is thus used to prevent this problem.

Next, the following describe the method of setting the disc case into the case holder in the back-and-forth direction.

FIG. 22 is a perspective view showing a case holder, and FIG. 23 is a perspective view showing a condition wherein the insertion direction of the disc case 10 into a holder 101 is orthogonal to the sliding direction of the shutter 140. The holder 104 is provided with L-shaped case guides 102 at the left and right ends thereof. Each of the case guides 102 is provided with a case stopper 103 at the forefront portion thereof to prevent the case 10 from advancing further. Outside the stopper 103, a shutter opener 610 is installed. The tip of the rotatable arm 612 of the shutter opener 610 is provided with a cylindrical pin 611. In addition, the arm 612 is spring-loaded at all times toward the insertion side of the disc case 10 by a torsion spring 613. The arm 612 is provided with a bent projection portion 614 as shown in FIG. 23. This projection portion 614 makes contact with the front fringe portion of the holder 101 so as to prevent the arm 612 from rotating further toward the insertion side. The position of the pin 611 determined by the projection portion 614 and the spring 613 corresponds to the position of the step 142-R of the shutter 140 of the case 10 to be inserted. As a result, when the case 10 is inserted into the holder 101, the pin 611 smoothly makes contact with the step 142-R.

FIG. 23 is a view showing a condition wherein the disc case 10 is inserted into the holder 101 in the direction indicated by arrow A. As shown in FIG. 23, the pin 611 of the shutter opener 610 makes contact with the surfaces 142-R1 and 142-R2 of the step 142-R of the shutter 140, the arm 612 is rotated, and the shutter 140 is opened in the direction indicated by arrow B by the rotation force of the arm 612.

FIGS. 24 and 25 show a configuration wherein the insertion direction of the disc case 10 into the holder 101 is in parallel with the sliding direction of the shutter 140. The holder 111 shown in FIG. 24 is provided with a front case guide 112-F on the front side (the lower left region in FIG. 24) of the holder 111, and is also provided with a back case guide 112-B on the back side (the upper right region in FIG. 24) of the holder 111. The guides 112-F and 112-B are L-shaped, and their end portions are provided with case stoppers 113-F and 113-B so as to prevent the case 10 from being inserted further. In addition, the front case guide 112-F is provided with a gap 114 at a midpoint thereof to form a step. The portion 112-F1, one of the two portions of the front case guide 112-F and being close to the case insertion position, is shifted forward from the other portion 112-F2 so as not to collide with the protrusion portion 141 of the shutter 140 to be inserted. On the other hand, the end portion 1140 (the end portion facing the gap 114) of the other portion 112-F2 makes contact with the step 142-R of the protrusion portion 141.

As shown in FIG. 25, the case 10 is inserted sideways into the holder 111 in the direction from upper left to lower right in the figure (see arrow A). In other words, the case 10 is inserted while the front fringe portion of the case 10 is directed lower left in the figure. Therefore, the protrusion portion 141 of the shutter 140 of the case 10 is moved along the lower left case guide 112-F of the holder 111. As the protrusion portion 141 is guided by the guide portion 112-F1 during the insertion, the surface 142-R2 of the step 142-R of the protrusion portion 141 makes contact with the end portion 1140 of the other guide portion 112-F2. Consequently, as the case 10 is inserted further, the shutter 140 is opened in the direction indicated by arrow B because of the existence of the end portion 1140 of the other guide portion 112-F2.

In this way, the disc case in accordance with the first embodiment can be inserted into the player both in the back-and-forth direction and in the lateral direction, and can be used in the player.

The shutter 140 can be formed into a simple rectangular shape by eliminating the protrusion portion 141, the steps 142-R and 142-L. In this case, the shutter opener 610 and the end portion 1140 make contact with the corner portion of the front fringe portion of the shutter 140 (refer to the following description of a second embodiment.)

(b) A second embodiment of the other embodiments is described below referring to FIGS. 26 to 30. FIG. 26 is a perspective view showing a disc case 10 in accordance with the present embodiment; FIG. 27 is a perspective view showing a condition wherein the shutter 145 of the disc case 10 is open; FIG. 28 is a plan view showing the disc case 10 shown in FIG. 27; FIG. 29 is a perspective view showing a case holder; and FIG. 30 is a perspective view showing a condition wherein the disc case 10 in accordance with the present embodiment is set in the holder shown in FIG. 29. As obviously shown in FIGS. 26 and 28, in the present embodiment, the front position of the forefront fringe portion 1451 of the shutter 145 is the same as the positions of the forefront fringe portions 120-R1 and 120-L1 of the right fringe portion 120-R and the left fringe portion 120-L of the upper half 12 of the main unit of the disc case 10, and is also the same as the positions of the forefront fringe portions 130-R1 and 130-L1 of the right fringe portion 130-R and the left fringe portion 130-L of the lower half 13. In addition, as shown in FIG. 26, the front fringe portions 24 and 30 of the upper half 12 and the lower half 13 are behind the forefront fringe portion 1451, the forefront fringe portions 120-R1, 120-L1, 130-R1 and 130-L1. Furthermore, a gap 123-R is formed between the forefront fringe portion 120-R1 of the right fringe portion 120-R of the upper half 12 and the forefront fringe portion 130-R1 of the right fringe portion 130-R of the lower half 13. Moreover, a gap 123-L is formed between the forefront fringe portion 120-L1 of the left fringe portion 120-L of the upper half 12 and the forefront fringe portion 130-L1 of the left fringe portion 130-L of the lower half 13.

The following describe a method of inserting and setting the above-mentioned disc case 10 into a case holder 115 shown in FIG. 29 in the lateral direction. A front case guide 116-F is provided on the front side (the lower left region in the figure) of the case holder 115, and a back case guide 116-B is provided on the back side (the upper right region in the figure) of the case holder 115. These guides 116-F and 116-B are L-shaped, and their end portions are provided with case stoppers 117-F and 117-B to prevent the case 10 from being inserted further. Additionally, a cutout 119 is formed at the central portion of the front case guide 116-F, and a projection 118 is formed inward in the cutout 119.

The case 10 is inserted into the case holder 115 having the above-mentioned structure as shown in FIG. 30. More specifically, the case 10 is inserted sideways into the holder 115 in the direction from upper left to lower right in the figure (see arrow A). In other words, the case 10 is inserted while the front fringe portion of the case 10 is directed lower left. Therefore, the corner portion 145-R at the front fringe portion of the shutter 145 of the case 10 is moved along the lower left case guide 116-F of the holder 115. As the corner portion 145-R is guided by the guide 116-F during the insertion, the corner portion 145-R makes contact with the projection 118 of the guide 116-F. Consequently, as the case 10 is inserted further, the shutter 145 is opened in the direction indicated by arrow B because of the existence of the projection 118 of the guide. Even when the case 10 is inserted upside down, the case 10 can be inserted in the same way as described above.

The following describe a method of inserting and setting the above-mentioned disc case 10 into a case holder in the back-and-forth direction. In this case, the disc case 10 is inserted into the case holder 101 shown in FIG. 22. As the disc case 10 is inserted in this case, the pin 611 of the shutter opener 610 makes contact with the corner portion 145-R of the shutter 145, and opens the shutter 145 while keeping contact with the corner portion 145-R.

In this way, the disc case in accordance with the second embodiment can be inserted into and used in the player both in the back-and-forth direction and in the lateral direction. Unlike the first embodiment, the second embodiment can have the case guides 116-F and 116-B along the full length of the holder. Therefore, the second embodiment is advantageous in that the disc case can be inserted stably.

The following describe a case wherein the front position of the forefront fringe portion 1451 of the shutter 145 is behind the forefront fringe portions 120-R1 and 120-L1 of the right fringe portion 120-R and the left fringe portion 120-L of the upper half 12 of the main unit of the case.

In case the front position of the forefront fringe portion 1451 of the shutter 145 is behind the forefront fringe portions 120-R1 and 120-L1 of the right fringe portion 120-R and the left fringe portion 120-L of the upper half 12 of the main unit of the case unit, and is also behind the forefront fringe portions 130-R1 and 130-L1 of the right fringe portion 130-R and the left fringe portion 130-L of the lower half 13 of the main unit of the case, the disc case can also be set into the player both in the lateral direction and in the back-and-forth direction by making the depths of the gaps 123-R and 123-L larger than those of the above-mentioned embodiment.

In the present invention, the connection between the upper half 12 and the lower half 13 can be accomplished by welding or screw tightening. Alternatively, engagement pawls provided on the upper half 12 can be engaged with engagement holes provided in the lower half 13. Conversely, engagement holes provided in the upper half 12 can be engaged with engagement pawls provided on the lower half 13.

Furthermore, although it is assumed that the disc 11 is an optical disc, it can be assumed that the disc 11 is a magnetic disc. Moreover, although it is assumed that both surfaces of the disc 11 are used as signal recording surfaces on which signals can be read and written, only one surface can be used as a signal recording surface. What is more, the disc 11 can be a disc having surfaces on which no signal can be written. After all, the disc in accordance with the present invention should have at least one signal recording surface on which signals can be read and/or written.

In case the disc 11 has one signal recording surface, one of the two slide members can be secured.

Additionally, in the above-mentioned embodiments, although it is assumed that the head access opening communicates with the chucking member access openings, these openings can be provided independently.

Besides, in the above-mentioned embodiments, although the upper concave portion 23 and the lower concave portion 29 are provided to decrease the movement amount of the disc 11 when the disc 11 is dropped onto the disc table, the concave portions of the present invention are not limited to those used for decreasing the amount of drop, but can be provided for other purposes as a matter of course. In short, when there is a passage from a portion not covered with the shutter to the accommodation chamber, a shielding portion should only be provided to prevent dust from passing through the passage.

Further, it is assumed that the concave portions in accordance with the present invention designate the upper concave portion 23 and the lower concave portion 29 in the descriptions of the above-mentioned embodiments, the concave portions are not limited to such concave portions, but can also designate a space ranging from the upper concave portion 23 to a cutout on the side of the upper front fringe portion 24 and a space ranging from the lower concave portion 29 to a cutout on the side of the lower front fringe portion 30. Still more, when the bridge portion is not used to directly form the side wall surface of the accommodation chamber, but is provided closer to the front fringe portion of the case and when a space is present therebetween just as in the case of the above-mentioned embodiment, the space can also be referred to as the concave portion of the present invention. In other words, holes can also be regarded as the concave portions of the present invention.

More and more, in the present invention, a condition wherein the shutter covers the concave portions does not mean that the concave portions are hermetically sealed, but may mean that there are still gaps which are not covered.

As obviously understood from the above-mentioned descriptions, the disc case of the present invention is simple in structure and can be assembled easily. In case the shutter covers part of the concave portions, the support member access openings and the head access opening, the shutter can have an effect of completely blocking the accommodation chamber.

What is claimed is:

1. A disc case comprising:
    a main unit of a case provided with:
        (a) an accommodation chamber capable of rotatably accommodating a disc having a signal recording surface on at least one side thereof,
        (b) support member access openings provided in at least one of a top wall and a bottom wall of said accommodation chamber so that a chucking member can externally pressure-contact said disc,
        (c) a head access opening formed in at least one of the top wall and the bottom wall of said accommodation chamber and being tangent to a side wall surface of said accommodation chamber so that a head for at least one of reading and recording signals on said signal recording surface can gain access to said disc, and
        (d) a concave portion formed in such a range from said side wall surface at said head access opening to a front fringe portion side of said main unit of said case and being concave with respect to at least one of the top wall and the bottom wall of said main unit of said case,
    a shutter installed on said main unit of said case so as to cover said support member access openings, said head access opening and said concave portion when said shutter is in a closed position, and so as to expose said support member access openings and said head access opening by sliding in at least one direction from said closed position along said front fringe portion of said main unit of said case when said shutter is in an open position, and
    a shielding portion provided on said main unit of said case so as to shield at least one of all of and part of passages communicating with said accommodation chamber via said concave portion from areas which are not covered with said shutter when said shutter is in said closed position,
    wherein said areas not covered with said shutter when said shutter is in said closed position are at least one of a hole and an opening provided in at least one of said shutter, and a slit provided in said front fringe portion of said main unit of said case.

2. A disc case according to claim 1, wherein said head is an optical head.

3. A disc case according to claim 1, wherein said support member access openings communicate with said head access opening.

4. A disc case according to claim 1, wherein said concave portion is provided so as to decrease the amount of movement when said disc is dropped onto a disc table constituting said chucking member.

5. A disc case according to claim 1, wherein said concave portion is formed at a portion in a range from said head access opening to said front fringe portion of said main unit of said case.

6. A disc case according to claim 1, wherein said head access opening is formed in the top wall and the bottom wall of said accommodation chamber.

7. A disc case according to claim 1 wherein,
    said two slide members are connected and pulled to each other with a spring,
    said two slide members are each prevented from entering a central portion of said front fringe portion of said main unit of said case by at least one stopper member provided in said front fringe portion, and
    said shutter is slidable in at least one of one direction and a direction opposite thereto, and exerts a force to one of said two slide members when said shutter slides so as to slide said one of said two slide members against the force of said spring.

8. A disc case according to claim 7, wherein said two slide members are guided by a rail provided near said front fringe portion of said main unit of said case, and
    said at least one stopper member is an end portion of a groove provided in said rail.

9. A disc case according to claim 1, wherein the side wall of said shutter is provided with a hole, said two slide members can be locked to said shutter, and
    a lock condition of said shutter is released when means for releasing the lock condition is inserted into said hole from outside.

10. A disc case according to claim 9, wherein said hole in the side wall of said shutter is a hole not covered with said shutter when said shutter is closed.

11. A disc case comprising:
    a main unit of a case provided with an accommodation chamber capable of rotatably accommodating a disc, support member access openings provided in said accommodation chamber so that a chucking member can externally pressure-contact said disc, a head access opening formed in said accommodation chamber so that a head for at least one of reading and recording signals can access said disc, and
    a shutter installed on said main unit of said case so as to cover said support member access openings and said head access opening when said shutter is in a closed position, and so as to expose said support member access openings and said head access opening by sliding in at least one direction along said front fringe portion of said main unit of said case when said shutter is in an open position, said shutter having a corner portion which can make contact with a shutter opener provided on drive means,
    said main unit having a forefront fringe portion of said main unit of said case which protrudes further forward than a forefront fringe portion of said shutter, and
    a gap is formed in the slide direction of said shutter at said fringe portion of said main unit of said case, said forefront fringe portion of said main unit being disposed further forward than said forefront fringe portion of said shutter, said gap is so formed such that at least a part of the corner portion can be seen through said gap from a side surface of the main unit of the case said shutter shaped and positioned so that it is engaged so that it is opened when said disc case is inserted in a signal recording or reproducing apparatus in a parallel direction to sliding of said shutter, said shutter shaped and positioned so that it is engaged so that it is opened when said disc case is inserted in said signal recording or reproducing apparatus in a perpendicular direction to sliding of said shutter.

12. A disc case comprising:

a main unit of a case provided with an accommodation chamber capable of rotatably accommodating a disc, support member access openings provided in said accommodation chamber so that a chucking member can externally pressure-contact said disc, a head access opening formed in said accommodation chamber so that a head for at least one of reading and recording signals can access said disc, and a shutter installed on said main unit of said case so as to cover said support member access openings and said head access opening when said shutter is in a closed position, and so as to expose said support member access openings and said head access opening by sliding in at least one direction along said front fringe portion of said main unit of said case when said shutter is in an open position, said shutter having a corner portion which can make contact with a shutter opener provided on drive means, said main unit having a forefront fringe portion of said main unit of said case and a forefront fringe portion of said shutter are located at a same position in a forward direction, and a gap is formed in the slide direction of said shutter at said forefront fringe portion of said main unit of said case, said forefront fringe portion of said main unit being located at the same position as that of said forefront fringe portion of said shutter, said gap is so formed such that at least a part of the corner portion can be seen through said gap from a side surface of the main unit of the case said shutter shaped and positioned so that it is engaged so that it is opened when said disc case is inserted in a signal recording or reproducing apparatus in a parallel direction to sliding of said shutter, said shutter shaped and positioned so that it is engaged so that it is opened when said disc case is inserted in said signal recording or reproducing apparatus in a perpendicular direction to sliding of said shutter.

13. A disc case comprising:

a case including i) an accommodation chamber capable of rotatably accommodating a disc, ii) support member access openings provided in said accommodation chamber so that a chucking member can externally pressure-contact said disc, and iii) a head access opening formed in said accommodation chamber, a shutter installed on said case so as to cover said support member access openings and said head access opening when said shutter is in a closed position, and so as to expose said support member access openings and said head access opening by sliding in at least one direction along a front fringe portion of said case when said shutter is in an open position, and a shielding portion provided on said case so as to shield at least one of and part of passages communicating with said accommodation chamber from areas which are not covered with said shutter when said shutter is in said closed position, and two slide members slidable along said front fringe portion of said case, said two slide members forming said shielding portion, wherein said areas not covered with said shutter when said shutter is in said closed position are at least one of a hole and an opening provided in at least one of said shutter, and a slit provided in said front fringe portion of said case.

14. A disc case comprising:

a main unit of a case provided with:
(a) an accommodation chamber capable of rotatably accommodating a disc having a signal recording surface on at least one side thereof,
(b) support member access openings provided in at least one of a top wall and a bottom wall of said accommodation chamber so that a chucking member can externally pressure-contact said disc,
(c) a head access opening formed in at least one of the top wall and the bottom wall of said accommodation chamber and being tangent to a side wall surface of said accommodation chamber so that a head for at least one of reading and recording signals on said signal recording surface can gain access to said disc, and
(d) a concave portion formed in such a range from said side wall surface at said head access opening to a front fringe portion side of said main unit of said case and being concave with respect to at least one of the top wall and the bottom wall of said main unit of said case, a shutter installed on said main unit of said case so as to cover said support member access openings, said head access opening and said concave portion when said shutter is in a closed position, and so as to expose said support member access openings and said head access opening by sliding in at least one direction from said closed position along said front fringe portion of said main unit of said case when said shutter is in an open position, a shielding portion provided on said main unit of said case so as to shield at least one of all of and part of passages communicating with said accommodation chamber via said concave portion from areas which are not covered with said shutter when said shutter is in said closed position, and two slide members slidable along said front fringe portion of said main unit of said case, said two slide members forming said shielding portion, wherein said areas not covered with said shutter when said shutter is in said closed position are at least one of a hole and an opening provided in at least one of said shutter, and a slit provided in said front fringe portion of said main unit of said case.

15. A disc case comprising:

a main unit of a case provided with an accommodation chamber capable of rotatably accommodating a disc, support member access openings provided in said accommodation chamber so that a chucking member can externally pressure-contact said disc, a head access opening formed in said accommodation chamber so that a head for reading and/or recording signals can gain access to said disc, a shutter installed on said main unit of said case so as to cover said support member access openings and said head access opening when closed, and so as to expose said support member access openings and said head access opening by sliding in at least one direction along a front fringe portion of said main unit of said case when open, and two slide members slidable along said front fringe portion of said main unit of said case, said two slide members forming a shielding portion on said main unit of said case so as to shield at least a portion of passages communicating with said accommodation chamber, wherein a forefront fringe portion of said shutter protrudes further forward than a forefront fringe portion of said main unit of said case, such that when said disc case is inserted into said case holder for holding said disc case, a shutter opener provided on said case holder makes contact with a corner portion of the forefront fringe portion of said shutter so as to open said shutter, and said corner portion is provided with a step.

16. A disc case comprising:

a main unit of a case provided with an accommodation chamber capable of rotatably accommodating a disc, support member access openings provided in said accommodation chamber so that a chucking member can externally pressure-contact said disc, a head access opening formed in said accommodation chamber so that a head for at least one of reading and recording signals can access said disc, a shutter installed on said main unit of said case so as to cover said support member access openings and said head access opening when said shutter is in a closed position, and so as to expose said support member access openings and said head access opening by sliding in at least one direction along said front fringe portion of said main unit of said case when said shutter is in an open position, said shutter having a corner portion which can make contact with a shutter opener provided on drive means, and two slide members slidable along said front fringe portion of said main unit of said case, said two slide members forming a shielding portion on said main unit of said case so as to shield at least a portion of passages communicating with said accommodation chamber, said main unit having a forefront fringe portion of said main unit of said case which protrudes further forward than a forefront fringe portion of said shutter, and a gap is formed in the slide direction of said shutter at said fringe portion of said main unit of said case, said forefront fringe portion of said main unit being disposed further forward than said forefront fringe portion of said shutter, said gap is so formed such that at least a part of the corner portion can be seen through said gap from a side surface of the main unit of the case.

17. A disc case comprising:

a main unit of a case provided with an accommodation chamber capable of rotatably accommodating a disc, support member access openings provided in said accommodation chamber so that a chucking member can externally pressure-contact said disc, a head access opening formed in said accommodation chamber so that a head for at least one of reading and recording signals can access said disc, a shutter installed on said main unit of said case so as to cover said support member access openings and said head access opening when said shutter is in a closed position, and so as to expose said support member access openings and said head access opening by sliding in at least one direction along said front fringe portion of said main unit of said case when said shutter is in an open position, said shutter having a corner portion which can make contact with a shutter opener provided on drive means, two slides members slidable along said front fringe portion of said main unit of said case, said two slide members forming a shielding portion on said main unit of said case so as to shield at least a portion of passages communicating with said accommodation chamber, said main unit having a forefront fringe portion of said main unit of said case and a forefront fringe portion of said shutter are located at a same position in a forward direction, and a gap is formed in the slide direction of said shutter at said forefront fringe portion of said main unit of said case, said forefront fringe portion of said main unit being located at the same position as that of said forefront fringe portion of said shutter, said gap is so formed such that at least a part of the corner portion can be seen through said gap from a side surface of the main unit of the case.

* * * * *

UNITED STATES PATENT AND TRADEMARK OFFICE
CERTIFICATE OF CORRECTION

PATENT NO. : 6,269,073 B1
DATED : July 31, 2001
INVENTOR(S) : Goto et al.

It is certified that error appears in the above-identified patent and that said Letters Patent is hereby corrected as shown below:

<u>Title page,</u>
Item [56], References Cited, FOREIGN PATENT DOCUMENTS, delete:
" 195 535     9/1986      (EP)
  295 025    12/1988      (EP)
  332 214     9/1989      (EP)
  690 444     1/1996      (EP)
  2278510     9/1994      (GB)".

Signed and Sealed this

Tenth Day of September, 2002

Attest:

JAMES E. ROGAN
Attesting Officer     Director of the United States Patent and Trademark Office